US008352354B2

(12) United States Patent
Sylvester

(10) Patent No.: US 8,352,354 B2
(45) Date of Patent: Jan. 8, 2013

(54) SYSTEM AND METHOD FOR OPTIMIZING ORDER EXECUTION

(75) Inventor: Benjamin F. Sylvester, Darien, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 201 days.

(21) Appl. No.: 12/837,624

(22) Filed: Jul. 16, 2010

(65) Prior Publication Data
US 2011/0208634 A1 Aug. 25, 2011

Related U.S. Application Data

(60) Provisional application No. 61/307,216, filed on Feb. 23, 2010.

(51) Int. Cl.
G06Q 40/00 (2012.01)
(52) U.S. Cl. .................. 705/37; 705/35; 705/36 R
(58) Field of Classification Search .................. 705/35, 705/36 R, 37
See application file for complete search history.

(56) References Cited

U.S. PATENT DOCUMENTS

| 4,169,285 | A | 9/1979 | Walker |
| 4,648,038 | A | 3/1987 | Roberts et al. |
| 4,739,478 | A | 4/1988 | Roberts et al. |
| 4,742,457 | A | 5/1988 | Leon et al. |
| 4,752,877 | A | 6/1988 | Roberts et al. |
| 4,933,842 | A | 6/1990 | Durbinet et al. |
| 5,121,469 | A | 6/1992 | Richards et al. |
| 5,222,019 | A | 6/1993 | Yoshino et al. |
| 5,257,369 | A | 10/1993 | Skeen et al. |
| 5,270,922 | A | 12/1993 | Higgins |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,419,890 | A | 5/1995 | Saidi |
| 5,454,104 | A | 9/1995 | Steidlmayer et al. |
| 5,462,438 | A | 10/1995 | Becker et al. |
| 5,497,317 | A | 3/1996 | Hawkins et al. |
| 5,517,406 | A | 5/1996 | Harris et al. |

(Continued)

FOREIGN PATENT DOCUMENTS
WO WO 98/43170 10/1998
(Continued)

OTHER PUBLICATIONS

Manco et al., A Framework for Adaptive Mail Classification, 14th IEEE Conference on Tools with Artificial Intelligence (ICTAI'02), Nov. 4, 2002, p. 387.

(Continued)

Primary Examiner — Lalita M Hamilton
(74) Attorney, Agent, or Firm — Hunton & Williams LLP

(57) ABSTRACT

An embodiment of the present invention provides computer-implemented methods and systems for optimizing the executing an order, such as trading orders. An order may be electronically routed to an Execution Optimizer ("EO"). The EO may apply a particular profile to the order, corresponding to a particular portfolio manager. Next, the order, with the profile, may be routed, electronically, to a third party where a prediction model may be applied to the order, indicating trading parameters for the order. The order, with the trading parameters from the prediction model, may be passed back to the EO, where a rules engine may apply rules, specific to the executing financial institution, to the order. The order may then be passed to a selected broker for market trading.

20 Claims, 12 Drawing Sheets

U.S. PATENT DOCUMENTS

| | | | |
|---|---|---|---|
| 5,557,798 | A | 9/1996 | Skeen et al. |
| 5,563,783 | A | 10/1996 | Stolfo et al. |
| 5,592,379 | A | 1/1997 | Finfrock et al. |
| 5,649,186 | A | 7/1997 | Ferguson |
| 5,675,746 | A | 10/1997 | Marshall |
| 5,691,524 | A | 11/1997 | Josephson |
| 5,706,502 | A | 1/1998 | Foley et al. |
| 5,710,889 | A | 1/1998 | Clark et al. |
| 5,724,593 | A | 3/1998 | Hargrave, III et al. |
| 5,778,157 | A | 7/1998 | Oatman et al. |
| 5,783,808 | A | 7/1998 | Josephson |
| 5,787,402 | A | 7/1998 | Potter et al. |
| 5,787,403 | A | 7/1998 | Randle |
| 5,806,047 | A | 9/1998 | Hackel et al. |
| 5,806,048 | A | 9/1998 | Kiron et al. |
| 5,819,273 | A | 10/1998 | Vora et al. |
| 5,832,461 | A | 11/1998 | Leon et al. |
| 5,845,266 | A | 12/1998 | Lupien et al. |
| 5,852,811 | A | 12/1998 | Atkins |
| 5,864,827 | A | 1/1999 | Wilson |
| 5,870,723 | A | 2/1999 | Pare |
| 5,878,404 | A | 3/1999 | Stout, Jr. et al. |
| 5,880,725 | A | 3/1999 | Southgate |
| 5,890,140 | A | 3/1999 | Clark et al. |
| 5,913,214 | A | 6/1999 | Madnick et al. |
| 5,918,218 | A | 6/1999 | Harris et al. |
| 5,922,044 | A | 7/1999 | Banthia |
| 5,926,792 | A | 7/1999 | Koppes et al. |
| 5,940,810 | A | 8/1999 | Traub et al. |
| 5,944,784 | A | 8/1999 | Simonoff et al. |
| 5,946,667 | A | 8/1999 | Tull, Jr. et al. |
| 5,950,176 | A | 9/1999 | Keiser et al. |
| 5,966,531 | A | 10/1999 | Skeen et al. |
| 5,966,672 | A | 10/1999 | Knupp |
| 5,966,700 | A | 10/1999 | Gould et al. |
| 5,970,479 | A | 10/1999 | Shepherd |
| 5,986,673 | A | 11/1999 | Martz |
| 5,987,434 | A | 11/1999 | Libman |
| 5,995,943 | A | 11/1999 | Bull et al. |
| 6,006,206 | A | 12/1999 | Smith et al. |
| 6,012,042 | A | 1/2000 | Black et al. |
| 6,012,046 | A | 1/2000 | Lupien et al. |
| 6,018,714 | A | 1/2000 | Risen, Jr. |
| 6,018,721 | A | 1/2000 | Aziz et al. |
| 6,023,280 | A | 2/2000 | Becker et al. |
| 6,026,381 | A | 2/2000 | Barton, III et al. |
| 6,029,146 | A | 2/2000 | Hawkins et al. |
| 6,029,147 | A | 2/2000 | Horadan et al. |
| 6,029,153 | A | 2/2000 | Bauchner et al. |
| 6,035,287 | A | 3/2000 | Stallaert et al. |
| 6,049,783 | A | 4/2000 | Segal et al. |
| 6,052,673 | A | 4/2000 | Leon et al. |
| 6,055,522 | A | 4/2000 | Krishna et al. |
| 6,058,378 | A | 5/2000 | Clark et al. |
| 6,061,662 | A | 5/2000 | Makivic |
| 6,064,984 | A | 5/2000 | Ferguson et al. |
| 6,070,151 | A | 5/2000 | Frankel |
| 6,073,104 | A | 6/2000 | Field |
| 6,073,109 | A | 6/2000 | Flores et al. |
| 6,073,115 | A | 6/2000 | Marshall |
| 6,076,072 | A | 6/2000 | Libman |
| 6,078,903 | A | 6/2000 | Kealhofer |
| 6,078,914 | A | 6/2000 | Redfern |
| 6,078,956 | A | 6/2000 | Bryant et al. |
| 6,081,774 | A | 6/2000 | de Hita et al. |
| 6,088,685 | A | 7/2000 | Kiron et al. |
| 6,088,686 | A | 7/2000 | Walker et al. |
| 6,092,056 | A | 7/2000 | Tull, Jr. et al. |
| 6,105,005 | A | 8/2000 | Fuhrer |
| 6,131,082 | A | 10/2000 | Hargrave, III et al. |
| 6,134,600 | A | 10/2000 | Liu |
| 6,141,666 | A | 10/2000 | Tobin |
| 6,148,298 | A | 11/2000 | LaStrange et al. |
| 6,173,270 | B1 | 1/2001 | Cristofich et al. |
| 6,173,276 | B1 | 1/2001 | Kant et al. |
| 6,178,420 | B1 | 1/2001 | Sassano |
| 6,182,059 | B1 | 1/2001 | Angotti et al. |
| 6,185,567 | B1 | 2/2001 | Ratnaraj et al. |
| 6,185,682 | B1 | 2/2001 | Tang |
| 6,195,647 | B1 | 2/2001 | Martyn et al. |
| 6,226,623 | B1 | 5/2001 | Schein et al. |
| 6,233,566 | B1 | 5/2001 | Levine et al. |
| 6,236,972 | B1 | 5/2001 | Shkedy |
| 6,236,977 | B1 | 5/2001 | Verba et al. |
| 6,243,670 | B1 | 6/2001 | Bessho et al. |
| 6,260,021 | B1 | 7/2001 | Wong et al. |
| 6,263,321 | B1 | 7/2001 | Daughtery, III |
| 6,263,335 | B1 | 7/2001 | Paik et al. |
| 6,266,683 | B1 | 7/2001 | Yehuda et al. |
| 6,272,474 | B1 | 8/2001 | Garcia |
| 6,275,229 | B1 | 8/2001 | Weiner et al. |
| 6,278,982 | B1 | 8/2001 | Korhammer et al. |
| 6,278,996 | B1 | 8/2001 | Richardson et al. |
| 6,282,537 | B1 | 8/2001 | Madnick et al. |
| 6,285,986 | B1 | 9/2001 | Andrews |
| 6,285,989 | B1 | 9/2001 | Shoham |
| 6,304,858 | B1 | 10/2001 | Mosler et al. |
| 6,313,854 | B1 | 11/2001 | Gibson |
| 6,317,726 | B1 | 11/2001 | O'Shaughnessy |
| 6,317,728 | B1 | 11/2001 | Kane |
| 6,321,212 | B1 | 11/2001 | Lange |
| 6,323,881 | B1 | 11/2001 | Broulik et al. |
| 6,332,163 | B1 | 12/2001 | Bowman-Amuah |
| 6,338,055 | B1 | 1/2002 | Hagmann et al. |
| 6,338,068 | B1 | 1/2002 | Moore et al. |
| 6,343,287 | B1 | 1/2002 | Kumar et al. |
| 6,347,307 | B1 | 2/2002 | Sandhu et al. |
| 6,349,290 | B1 | 2/2002 | Horowitz et al. |
| 6,349,291 | B1 | 2/2002 | Varma |
| 6,356,933 | B2 | 3/2002 | Mitchell et al. |
| 6,360,210 | B1 | 3/2002 | Wallman |
| 6,366,908 | B1 | 4/2002 | Chong et al. |
| 6,381,585 | B1 | 4/2002 | Maples et al. |
| 6,381,586 | B1 | 4/2002 | Glasserman et al. |
| 6,385,660 | B2 | 5/2002 | Griesemer et al. |
| 6,389,413 | B2 | 5/2002 | Takahashi et al. |
| 6,389,452 | B1 | 5/2002 | Glass |
| 6,401,080 | B1 | 6/2002 | Bigus et al. |
| 6,408,282 | B1 | 6/2002 | Buist |
| 6,411,947 | B1 | 6/2002 | Rice et al. |
| 6,418,417 | B1 | 7/2002 | Corby et al. |
| 6,421,653 | B1 | 7/2002 | May |
| 6,424,980 | B1 | 7/2002 | Iizuka et al. |
| 6,429,868 | B1 | 8/2002 | Dehner, Jr. et al. |
| 6,442,545 | B1 | 8/2002 | Feldman et al. |
| 6,446,047 | B1 | 9/2002 | Brier et al. |
| 6,446,110 | B1 | 9/2002 | Lection et al. |
| 6,457,066 | B1 | 9/2002 | Mein et al. |
| 6,460,021 | B1 | 10/2002 | Kirksey |
| 6,480,882 | B1 | 11/2002 | McAdam et al. |
| 6,489,954 | B1 | 12/2002 | Powlette |
| 6,490,584 | B2 | 12/2002 | Barrett et al. |
| 6,493,681 | B1 | 12/2002 | Tertitski et al. |
| 6,510,406 | B1 | 1/2003 | Marchisio |
| 6,513,019 | B2 | 1/2003 | Lewis |
| 6,516,303 | B1 | 2/2003 | Wallman |
| 6,516,308 | B1 | 2/2003 | Cohen |
| 6,523,022 | B1 | 2/2003 | Hobbs |
| 6,556,987 | B1 | 4/2003 | Brown et al. |
| 6,564,250 | B1 | 5/2003 | Nguyen |
| 6,581,056 | B1 | 6/2003 | Rao |
| 6,581,062 | B1 | 6/2003 | Draper et al. |
| 6,598,028 | B1 | 7/2003 | Sullivan et al. |
| 6,601,044 | B1 | 7/2003 | Wallman |
| 6,611,825 | B1 | 8/2003 | Billheimer et al. |
| 6,615,187 | B1 | 9/2003 | Ashenmil et al. |
| 6,615,352 | B2 | 9/2003 | Terao et al. |
| 6,629,097 | B1 | 9/2003 | Keith |
| 6,631,373 | B1 | 10/2003 | Otani et al. |
| 6,633,868 | B1 | 10/2003 | Min et al. |
| 6,691,916 | B2 | 2/2004 | Noyes |
| 6,711,554 | B1 | 3/2004 | Salzmann et al. |
| 6,754,640 | B2 | 6/2004 | Bozeman |
| 6,766,304 | B2 | 7/2004 | Kemp et al. |
| 6,832,209 | B1 | 12/2004 | Karp et al. |
| 6,999,938 | B1 | 2/2006 | Libman |
| 7,051,929 | B2 | 5/2006 | Li |

| | | |
|---|---|---|
| 7,110,998 B1 | 9/2006 | Bhandari et al. |
| 7,191,392 B1 | 3/2007 | Coar |
| 7,212,993 B1 | 5/2007 | Bodurtha et al. |
| 7,222,094 B2 | 5/2007 | Ross |
| 7,233,921 B2 | 6/2007 | Takeda et al. |
| 7,249,037 B2 | 7/2007 | Koppes et al. |
| 7,249,075 B1 | 7/2007 | Altomare et al. |
| 7,249,077 B2 | 7/2007 | Williams et al. |
| 7,272,580 B2 | 9/2007 | Brady et al. |
| 7,313,541 B2 | 12/2007 | Wise et al. |
| 7,363,492 B2 | 4/2008 | Kuhlman et al. |
| 7,376,606 B2 | 5/2008 | Jacobsen |
| 7,392,210 B1 | 6/2008 | MacKay et al. |
| 7,392,212 B2 | 6/2008 | Hancock et al. |
| 7,499,881 B2 | 3/2009 | Henninger et al. |
| 7,577,604 B2 | 8/2009 | Ogilvie |
| 7,593,881 B2 | 9/2009 | Winklevoss et al. |
| 7,596,526 B2 | 9/2009 | Blauvelt et al. |
| 7,606,746 B2 | 10/2009 | Hitchings et al. |
| 7,613,647 B1 | 11/2009 | Cushing et al. |
| 7,620,578 B1 | 11/2009 | Belton et al. |
| 7,650,306 B2 | 1/2010 | Barany et al. |
| 7,657,474 B1 | 2/2010 | Dybala et al. |
| 7,685,037 B2 | 3/2010 | Reiners et al. |
| 7,689,484 B2 | 3/2010 | Hall et al. |
| 7,693,790 B2 | 4/2010 | Lawlor et al. |
| 7,716,107 B1 | 5/2010 | Variankaval et al. |
| 7,720,736 B2 | 5/2010 | Yolles |
| 7,818,246 B2 * | 10/2010 | Cushing et al. .................. 705/37 |
| 2001/0011241 A1 | 8/2001 | Nemzow |
| 2001/0011242 A1 | 8/2001 | Allex et al. |
| 2001/0018674 A1 | 8/2001 | Schein et al. |
| 2001/0020236 A1 | 9/2001 | Cannon |
| 2001/0025264 A1 | 9/2001 | Deaddio et al. |
| 2001/0029482 A1 | 10/2001 | Tealdi et al. |
| 2001/0032217 A1 | 10/2001 | Huang |
| 2001/0037284 A1 | 11/2001 | Finkelstein et al. |
| 2001/0042034 A1 | 11/2001 | Elliott |
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0010670 A1 | 1/2002 | Mosler et al. |
| 2002/0013753 A1 | 1/2002 | Marks de Chabris et al. |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0019805 A1 | 2/2002 | Kalotay |
| 2002/0022956 A1 | 2/2002 | Ukranincsky et al. |
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0029183 A1 | 3/2002 | Vlahoplus et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0046154 A1 | 4/2002 | Pritchard |
| 2002/0046158 A1 | 4/2002 | Kelly et al. |
| 2002/0049665 A1 | 4/2002 | Solomon et al. |
| 2002/0049666 A1 | 4/2002 | Reuter et al. |
| 2002/0054115 A1 | 5/2002 | Mack et al. |
| 2002/0055901 A1 | 5/2002 | Gianakouros et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087391 A1 | 7/2002 | Williams |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0091609 A1 | 7/2002 | Markowski |
| 2002/0099646 A1 | 7/2002 | Agarwal et al. |
| 2002/0099656 A1 | 7/2002 | Poh Wong |
| 2002/0112056 A1 | 8/2002 | Baldwin et al. |
| 2002/0123947 A1 | 9/2002 | Yuste et al. |
| 2002/0130868 A1 | 9/2002 | Smith |
| 2002/0138390 A1 | 9/2002 | May |
| 2002/0138414 A1 | 9/2002 | Baker, IV |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0153415 A1 | 10/2002 | Minami et al. |
| 2002/0156658 A1 | 10/2002 | Selesny et al. |
| 2002/0156719 A1 | 10/2002 | Finebaum et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2002/0198808 A1 | 12/2002 | Myers |
| 2002/0198818 A1 | 12/2002 | Scott et al. |
| 2002/0198833 A1 | 12/2002 | Wohlstadler |
| 2003/0004942 A1 | 1/2003 | Bird |
| 2003/0009411 A1 | 1/2003 | Ram et al. |
| 2003/0014343 A1 | 1/2003 | Jones |
| 2003/0018558 A1 | 1/2003 | Heffner et al. |
| 2003/0018714 A1 | 1/2003 | Mikhailov et al. |
| 2003/0033212 A1 | 2/2003 | Sandhu et al. |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0083975 A1 | 5/2003 | O'Grady et al. |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105806 A1 | 6/2003 | Gayle et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney |
| 2003/0154071 A1 | 8/2003 | Shreve |
| 2003/0154158 A1 | 8/2003 | Martyn et al. |
| 2003/0154306 A1 | 8/2003 | Perry |
| 2003/0158949 A1 | 8/2003 | Miller et al. |
| 2003/0163400 A1 | 8/2003 | Ross et al. |
| 2003/0163401 A1 | 8/2003 | Dines et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0229718 A1 | 12/2003 | Tock et al. |
| 2003/0233306 A1 * | 12/2003 | Madhavan et al. .................. 705/37 |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0039666 A1 | 2/2004 | Fudali et al. |
| 2004/0064397 A1 | 4/2004 | Lynn et al. |
| 2004/0068559 A1 | 4/2004 | Shaw |
| 2004/0078248 A1 | 4/2004 | Altschuler |
| 2004/0103003 A1 | 5/2004 | Mayers et al. |
| 2004/0128169 A1 | 7/2004 | Lusen |
| 2004/0148247 A1 | 7/2004 | Miller et al. |
| 2004/0167850 A1 | 8/2004 | Dreyer et al. |
| 2004/0193536 A1 | 9/2004 | Marlowe-Noren |
| 2004/0215553 A1 | 10/2004 | Gang et al. |
| 2004/0220885 A1 | 11/2004 | Salzmann et al. |
| 2004/0225536 A1 | 11/2004 | Schoen et al. |
| 2004/0225596 A1 | 11/2004 | Kemper et al. |
| 2004/0230843 A1 | 11/2004 | Jansen |
| 2004/0236671 A1 | 11/2004 | Woodruff et al. |

| | | | |
|---|---|---|---|
| 2005/0010517 | A1 | 1/2005 | Lowenstein et al. |
| 2005/0060254 | A1 | 3/2005 | Jones |
| 2005/0060256 | A1 | 3/2005 | Peterson et al. |
| 2005/0071265 | A1 | 3/2005 | Nishimaki |
| 2005/0075959 | A1 | 4/2005 | Woodruff et al. |
| 2005/0080695 | A1 | 4/2005 | Gatto |
| 2005/0086148 | A1 | 4/2005 | Woodruff et al. |
| 2005/0086170 | A1 | 4/2005 | Rao |
| 2005/0102213 | A1 | 5/2005 | Savasoglu et al. |
| 2005/0102214 | A1 | 5/2005 | Speth et al. |
| 2005/0102220 | A1* | 5/2005 | Stackpole ............... 705/37 |
| 2005/0108118 | A1 | 5/2005 | Malackowski et al. |
| 2005/0125318 | A1 | 6/2005 | Jameson |
| 2005/0160025 | A1 | 7/2005 | Birle et al. |
| 2005/0164762 | A1 | 7/2005 | Smith et al. |
| 2005/0187851 | A1* | 8/2005 | Sant ....................... 705/36 |
| 2005/0209949 | A1 | 9/2005 | Le Guyader |
| 2006/0020559 | A1 | 1/2006 | Steinmetz |
| 2006/0031174 | A1 | 2/2006 | Steinmetz |
| 2006/0036647 | A1 | 2/2006 | Fichtner et al. |
| 2006/0074794 | A1 | 4/2006 | Nespola, Jr. |
| 2006/0136231 | A1 | 6/2006 | Thomas |
| 2006/0229973 | A1 | 10/2006 | Sternberg |
| 2006/0259394 | A1 | 11/2006 | Cushing et al. |
| 2006/0259407 | A1 | 11/2006 | Rosenthal et al. |
| 2006/0259419 | A1 | 11/2006 | Monsen et al. |
| 2006/0259766 | A1 | 11/2006 | Rasti |
| 2006/0271469 | A1 | 11/2006 | Rust |
| 2006/0282355 | A1 | 12/2006 | Canezin et al. |
| 2007/0005478 | A1 | 1/2007 | Lambe |
| 2007/0043654 | A1 | 2/2007 | Libman |
| 2007/0078771 | A1 | 4/2007 | Allin et al. |
| 2007/0156555 | A1 | 7/2007 | Orr |
| 2007/0180491 | A1 | 8/2007 | Mevissen et al. |
| 2007/0239579 | A1 | 10/2007 | Gulotta et al. |
| 2007/0244788 | A1 | 10/2007 | Ferris |
| 2008/0046263 | A1 | 2/2008 | Sager et al. |
| 2008/0071696 | A1 | 3/2008 | Haig |
| 2008/0189221 | A1 | 8/2008 | Coughlan et al. |
| 2008/0189222 | A1 | 8/2008 | Coughlan et al. |
| 2009/0112775 | A1 | 4/2009 | Chiulli et al. |
| 2009/0119226 | A1* | 5/2009 | Kurczek et al. ............ 705/36 R |
| 2009/0327159 | A1 | 12/2009 | Agarwal et al. |

FOREIGN PATENT DOCUMENTS

| | | |
|---|---|---|
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |
| WO | WO 2004/040419 | 5/2004 |

OTHER PUBLICATIONS

Silverman, A new strategy for giving away your money, Wall Street Journal, D1, Oct. 6, 2004.
Anderson, Hugh, Anderson, How Compound Interest Can Make You Rich, The Gazette, Final Edition, Montreal, Quebec, Jun. 25, 1991, p. TWIB.2.
Anonymous, Anonymous, What We Like About This Site, Internet Banking Growth Strategies, Storm Lake, vol. 2, Iss. 5, p. 1, Jan. 2002.
Anonymous, Anonymous, What we like about this site?, Internet Banking Growth Strategies, Storm Lake, Jan. 2002, vol. 2, Iss. 5 (1 page).
Czejdo, Automatic generation ontology based anntations in XML and their use in retrieval systems, Web Information Systems Engineering, 2000, Proceedings of the First International Conference, Jun. 19, 2000, p. 296.
Novell, Inc., Beginning of Viewing Information and Viewing Basic Information about a print job; Jun. 1, 1993.
Chacko, Cephalon, Inc. Taking Risk Management Gherory Seriously; May 1, 2001.
None, Class B Mutual Fund Shares Do They Make the Grade?; Jun. 25, 2003.
Huntley, Helen, Class B Mutual Fund Shares Face Increasing Scrutiny Series on Money; Feb. 6, 2005.
Commodity Futures Trading Commission (CFTC) Glossary, A Guide to the Language of the Futures Industry, Aug. 15, 2007 (http://www.cftc.gov/educationcenter/glossary/glossary_co.html).
Kus, Contingent capital just in the capital management sets a new standard Sponsored statement; Oct. 1, 2002.
Counterparty Risk Management Policy Group, Counterparty Risk Management Policy Group, Improving Counterparty Risk Management Practices, Jun. 1999.
Richburg, Keith et. al., Despite Madoff Guilty Plea Questions Swirl and Rage Boils Victims Gather at Courthouse as Financier Reports to Jail; Mar. 13, 2009.
Martin, Email Report, Issue 11, Aug. 16, 2001, printed Aug. 2, 2005.
Friis, Williams, Friis, Goodbye to Paper?, American Bankers Association, ABA Banking Journal, New York, Mar. 1989, vol. 81, Iss. 3 (5 pages).
Fast Email Extractor 4.4 (Abstract) cited at http://www.lemon.com/FEE.html, last upgrade Sep. 2, 2003.
Financial Accounting Standards Board, Financial Accounting Standards Board (FASB), FASB Interpretation No. 41, Dec. 1994.
Freddie Mac, Freddie Mac's Document Custody Procedure Handbook; Dec. 2009.
Freddie Mac's Document Custody Procedure Overview, pp. 1-2 and 7-16, Dec. 2003.
GHCO.com, Electronic Trading Tools (http://www.ghco.com/customer_services/trading_platforms.asp) (date unknown).
Ginnie Mae, Chapter 10—Assembling and Submitting Pool and Loan Package Issuance Documents, Jul. 1, 2003.
Hernan, Michael, Hernan, Simple vs Compound Interest a Wide Gap, 3rd Edition, The Morning Call, Allentown, PA, Dec. 6, 1992, p. D.01.
Pila, In Case of Emergency contingent capital; Sep. 1, 2001.
Intellseek and Inxight Partner to Provide New Business Intelligence Solutions, www.inxight.com/news/021029_intelliseek.html, Oct. 29, 2002.
Unknown, Investigating Systems www.investing-systems.com; Oct. 21, 2002.
Kane, Edward, Kane, Market Incompleteness and Divergences Between Forward and Futures Interest Rates, The Journal of Finance, vol. 35, No. 2, Papers and Proceedings Thirty-Eighth Annual Meeting American Finance Association, Atlanta, Georgia, Dec. 28-30, 1979 (May.
Lukenbill, Grant, Lukenbill, DraftWorldwide Adds 3 Dot Coms, iMarketing News, vol. 2, No. 18, p. 18, May 8, 2000.
Markman, Jon D., Markman, (Feb. 11, 1997), Wall Street, California, How About a Convertible Preferred?; Hybrid Can Offer a Stock's Growth but With Less Risk: Home Edition. Los Angeles Times, p. D, 5:1. Retrieved May 21, 2010 from Los Angeles Times (Document ID: 110385.
Mizushima, Hiromasa, Mizushima, The Nikko Securities Co., Ltd., Fixprotocol, Financial Information Exchange—FIX General Conference, Tokyo, Oct. 7, 1998.
Neumeister, Larry, Madoff Will Plead Guilty; Mar. 11, 2009.
May, Modeling and Querying Structure and Contents of the Web, 10th International Workshop on Database & Amp Expert Systems Applications, Sep. 1, 1999, p. 721.
Chang, Chun, Payout Policy, Capital Structure, and Compensation Contracts when Managers Value Control Author(s): Chun Chang Source: The Review of Financial Studies, vol. 6, No. 4 (Winter 1993), pp. 911-933 Published by: Oxford University Press. Sponsor: The Society.
Rupali et al., Phrase-based Text Representation for Managing the Web Documents; Apr. 28, 2003.
Lam et al., Querying Web Data—The WebQA Approach; Dec. 12, 2002.

Rising to the challenge of global STP, Euromoney Publications PLC Global Inventor, Nov. 1, 1999, pp. 51-52 Issn. 0951-3604.

STP in the Bond Market?, Wall Street & Technology, Dec. 1, 2002, p. 20.

Securities Market Practice Group, Block Trades Market Practice, Apr. 1, 2003, pp. 1-10.

Ericson, Softwerc releases patent-pending; Nov. 15, 2002.

IBM Corp., Strict Read Order Control for a Queing System; Mar. 1, 2002.

Carchiolo et al., Structuring the Web; Sep. 6, 2000.

Witten et al., Text Mining a New Frontier for Lossless Compression; Mar. 29, 1999.

Fan et al., The Internet and Future Financial Markets Industry Trend or Event, Association for Computing Machinery, Inc., Sec. 11, vol. 43 Nov. 1, 2000, p. 82 Issn 0001-0782.

Lauricella, Tom et. al., The Madoff Fraud Judge Names Trustee to Liquidate Madoff Firm; Dec. 17, 2008.

Emery, et al., The Measurement of Liquidity, Journal of Accounting Research, vol. 20, No. 2, Part 1, p. 290-303, Autumn 1982.

Calado, The Web-DL Environment for Building Digital Libraries from the Web; May 27, 2003.

Ribiero-Neto et al., Top Down Extraction of Semi-Structured Data, String Processing and Information Retrieval Symposium & amp; Sep. 21, 1999.

Roberts, Top Priority on Bottom Line More Companies Seeting to Manage Business Risks; Mar. 20, 2000.

TradeWeb's STP vision, Euromoney Institutional Investor PLC, Sec. 406, vol. 34, Feb. 1, 2003, p. S6 Issn 0014-2433.

United States Securities and Exchange Commission, Form 10-K, Annual Report Pursuant to Section 13 or 15(d) of the Securities Exchange Act of 1934, for Fiscal Year Ended Dec. 31, 2003.

Elkayam, Using Indexed Bonds; Apr. 11, 2002.

Anonymous, What We Like About This Site; Jan. 2002.

Myllymaki, With Standard XML Technologies; May 2, 2001.

Hewlett-Packard, x4queview.org; Mar. 2, 1992.

International Search Report with Written Report from PCT/US11/25404; Apr. 20, 2011.

International Search Report with Written Report from PCT/US11/25452; Apr. 7, 2011.

* cited by examiner

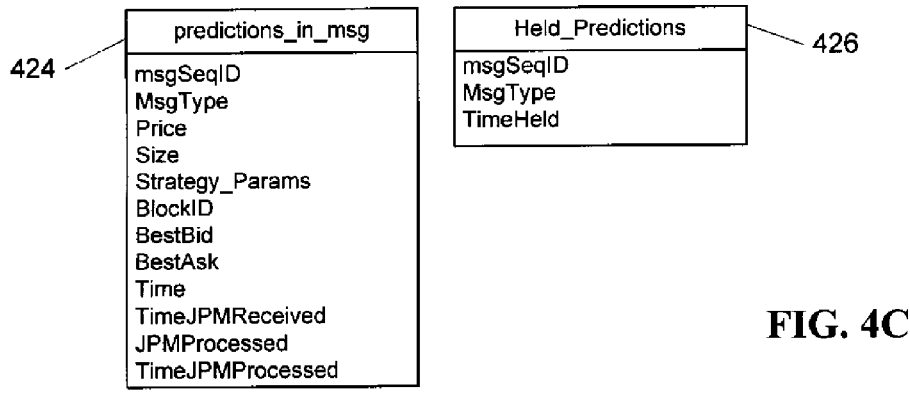
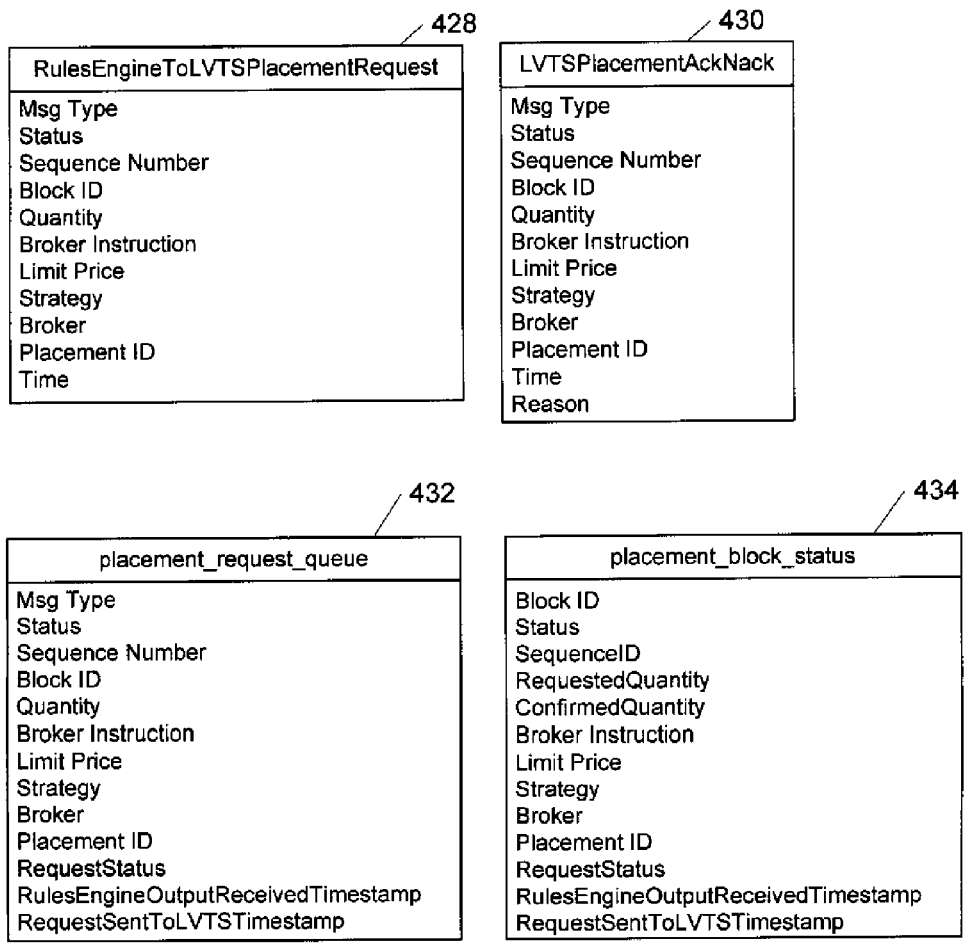
FIG. 4C

FIG. 5

File  Edit  Actions  View  Help

Blocks — 504

Block Orders — 502

| Alert | Status | Trade | Symbol | % PAL | Strategy | Eligible Qty | Active Qty | Filled Qty | Inactive Qty | AvgPX | RGL | UGL | TGL | Arrival PX | Last | Current Vol | 20 ADV (K) | % of Vol | Engine Control | Cxl |
|---|---|---|---|---|---|---|---|---|---|---|---|---|---|---|---|---|---|---|---|---|

506 — Auto Blocks
△⊘ Trader: Trader1

| △⊘ | OPEN | BUY | AAPL | 0% | NYEO | 3,600 | 3,600 | 500 | 0 | 214.76 | -108 | -38 | -147 | 213.56 | 215.67 | 52,070 | 19,060 | 1.00 | ⌐◻▸⊘☒ | ⊗ |
| ⊘ | OPEN | SELL | PG | 0% | NYEO | 29,605 | 29,605 | 1,500 | 0 | 10.66 | 5 | 1 | 5 | 10.56 | 10.66 | 9,840 | 10,580 | 1.50 | ⌐◻▸⊘☒ | ⊗ |
|  | DONE | SELL | GAP | 0% | NYEO | 0 | 0 | 1,000 | 0 | 4.95 | 4 | -40 | -157 | 4.75 | 4.99 | 668 | 715 | 4.00 | ⌐◻▸⊘☒ | ⊗ |

508 — △ Trader: Trader2

| △⊘ | PART | BUY | XYZ | 0% | NYEO | 1,000 | 1,000 | 3,000 | 0 | 1.25 | 33 | 14 | 47 | 1.35 | 1.25 | 2,010 | 1,990 | 1.00 | ⌐◻▸⊘☒ | ⊗ |
| ⊘ | PART | SELL | HOT | 0% | NYEO | 2,000 | 2,000 | 4,000 | 0 | 38.21 | 23 | 0 | 37 | 38.25 | 38.05 | 1,470 | 2,590 | 9.00 | ⌐◻▸⊘☒ | ⊗ |

510 — Active Blocks (LVTS)
Trader: Trader1

| | PART | BUY | HHY | 0% | | 2,000 | | 0 | 0 | 4.95 | -117 | -40 | -157 | 4.75 | 4.99 | 5,087 | 6,983 | 1.07 | | |
| | OPEN | SELL | ABCD | 0% | | 1,000 | | 1,000 | 0 | 4.95 | -117 | -40 | -157 | 4.75 | 4.99 | 500 | 750 | 0.01 | | |

Trader: Trader2

| | PART | BUY | HHY | 0% | | 2,000 | | 0 | 0 | 4.95 | -117 | -40 | -157 | 4.75 | 4.99 | 5,087 | 6,983 | 1.07 | | |
| | OPEN | SELL | ABCD | 0% | | 1,000 | | 1,000 | 0 | 4.95 | -117 | -40 | -157 | 4.75 | 4.99 | 500 | 750 | 0.01 | | |

Filter:
Open Blocks
Completed Blocks
Error Blocks
Manual Blocks

512 — Micro Orders | Graph | Other

| Time Placed | Strategy | Broker | Limit | Quantity | Qty Filled | Avg Price | Qty Closed | Status | Alerts |
|---|---|---|---|---|---|---|---|---|---|
| 13:14:57.57 | NYEO | GSCO | 38.50 | 300 | 300 | 38.45 | 0 | FILLED | |
| 13:14:12.12 | NYEO | WEED | 38.25 | 1,000 | 600 | 38.45 | 400 | CXLD | CXL ACCEPED |
| 13:13:43.43 | NYEO | DB | 38.10 | 500 | 500 | 38.45 | 0 | FILLED | |
| 13:10:12.12 | NYEO | GSCO | 37.90 | 600 | 600 | 38.45 | 0 | FILLED | |
| 13:08:28.28 | NYEO | MSCO | 38.80 | 1,000 | 0 | 38.45 | 0 | ERROR | Broker Unavailable |

522 — 524 — 526

Rules Management
Control
Problem Orders
Data Administration
Monitor

528

Errors/Alerts

| BlockID | STATUS | Symbol | AlertID | Alert Type | Alert Desc | Trader | Broker | Timestamp |
|---|---|---|---|---|---|---|---|---|
| 12345 | ERROR | AAPL | 21 | BRKR | Broker Unavailable | John | MSCO | ######## |
| 12341 | WARN | PG | 19 | PRED | Aged Prediction Rec | John | | ######## |

514 — 520

SYSTEM AND METHOD FOR OPTIMIZING ORDER EXECUTION

CROSS REFERENCE TO RELATED APPLICATIONS

This application claims the benefit of U.S. Provisional Application No. 61/307,216, filed Feb. 23, 2010, the contents of which are hereby incorporated by reference in their entirety.

This application is related to co-pending U.S. application Ser. No. 12/708,975, entitled "Execution Optimizer," the contents of which are hereby incorporated by reference in their entirety.

FIELD OF THE INVENTION

Embodiments of the invention relate generally to automating execution of trades. More specifically, embodiments are directed to method and system for automatically processing an order and applying certain models and profiles to the order.

BACKGROUND OF THE INVENTION

Investment banking covers a range of activities. Such activities include: underwriting, selling, and trading securities (e.g., stocks and bonds), providing financial advisory services such as mergers and acquisition advice, and managing assets. Investment banks offer these services to a variety of clients, both big and small, including, but not limited to, corporations, governments, non-profit institutions, and individuals. In addition, third party brokerage services provide many services similar to investment banks and interface with investment banks in many ways.

In the trading of securities, investment banking generally involves a buy side and a sell side. On the buy side, an investor or client provides the investment bank with an order. Typically the order is to conduct a transaction relating to securities, such as buying a certain amount of said securities. The order is typically placed with a person, such as a broker, trader, or portfolio manager. In many cases, the order is electronically placed over a computer network with the investment bank. The investment bank executes the order following receipt thereof. Depending upon various factors, such as size and price, the order is either be executed manually or executed automatically. Both types of execution typically occur in an appropriate computer based trading system. A delay in the execution of the order is possible. Such delays impact the order because market conditions are volatile. Changes in the market therefore occur from the time the order is placed to the time that the order is actually executed.

A delay in placing the order can have adverse consequences for the order. For example, the price of the security desired to be purchased can change, either up or down, between the time of order receipt and order execution. This is known as price slippage. Further, manually executing orders results in inconsistencies between orders.

SUMMARY OF THE INVENTION

An embodiment of the present invention provides a computer-implemented method for optimizing execution of an order. The method may involve the processing of trading orders. Orders may be placed into a trading system by a portfolio manager. The order may then be electronically routed to an Execution Optimizer ("EO"). The EO may be a computer based system with a number of components, applications, or modules, including a rules engine. Resident within the EO may be a series of profiles corresponding to a group of portfolio managers who are associated with the trading system. The EO may apply a particular profile, corresponding to a particular portfolio manager. Each profile may be based upon a particular portfolio manager's trading habits and historical trading profile. Hence, the profile may be designed to capture the trading habits of that portfolio manager. Each profile may be updated periodically. A profile may be based on historical data of the particular portfolio manager's portfolio. The application of the profile may be the appending, electronically, of the profile to the order.

Next, the order, with the profile, may be routed, electronically, to a third party. In some orders, the order may be flagged for manual execution, in which case a trader will handle the order processing, without the order being routed to the third party. At the third party, a prediction model may be applied to the order, indicating trading parameters for the order. The prediction model may be a price prediction model. The prediction model may use the profile information as parameters for the prediction model.

The order, with the trading parameters from the prediction model, may be passed back to the EO. In the EO, a rules engine will apply rules, specific to the executing financial institution, to the order. The order may then be passed to a selected broker for market trading. The selected broker may be determined by the rules. The EO has the capability to receive real time feedback on the order as it is traded. This feedback may be sent to the third party. The feedback may be used to update the prediction model and rules such that processing of the order may be adjusted in real time based on this market feedback. The rules engine can therefore apply iterative processing of the order.

An embodiment provides a computer-implemented method for optimizing automatic execution of an order for securities. An order for specified securities may be received. A profile may be applied to the order. The profile may be associated with a portfolio manager. The order and the profile may be routed to a third party for application of a prediction model to the order. The results from the prediction model may be received and a set of rules may be applied to the order. The order may be routed for execution in accordance with the set of rules and the results from the prediction model. Feedback may be received on the execution of the order. The set of rules may be updated based on the feedback and the feedback may be forwarded to the third party to update the prediction model.

Another embodiment provides a computer based system for optimizing automatic execution of an order for securities. The system may have a network with one or more servers, a workstation communicatively coupled to the network and providing an interface to the computer based system, an execution optimizer module, communicatively coupled to the network, and a database, communicatively coupled to the execution optimizer module. The execution optimizer module may perform the following functions: receiving an order for specified securities, determining a profile associated with a portfolio manager to apply to the order, applying the profile to the order, routing the order and the profile to a prediction engine, receiving results associated with the order from the prediction engine, applying a set of rules, using a rules engine module, to the order for determining the execution strategy for the order, forwarding the order for execution based on the prediction engine results and the set of rules, receiving feedback on the execution of the order, applying the feedback in real time to update the set of rules; and forwarding the feedback to the prediction engine. The database may contain the set of rules and the profile.

Advantages of this invention in addition to those described above are apparent from the following detailed description of exemplary embodiments of the invention.

BRIEF DESCRIPTION OF THE DRAWINGS

FIGS. 4A, 4B, 4C, and 4D are data fields associated with execution of an order in accordance with exemplary embodiments.

FIG. 5 shows a graphical user interface in accordance with exemplary embodiments.

Figure 1:
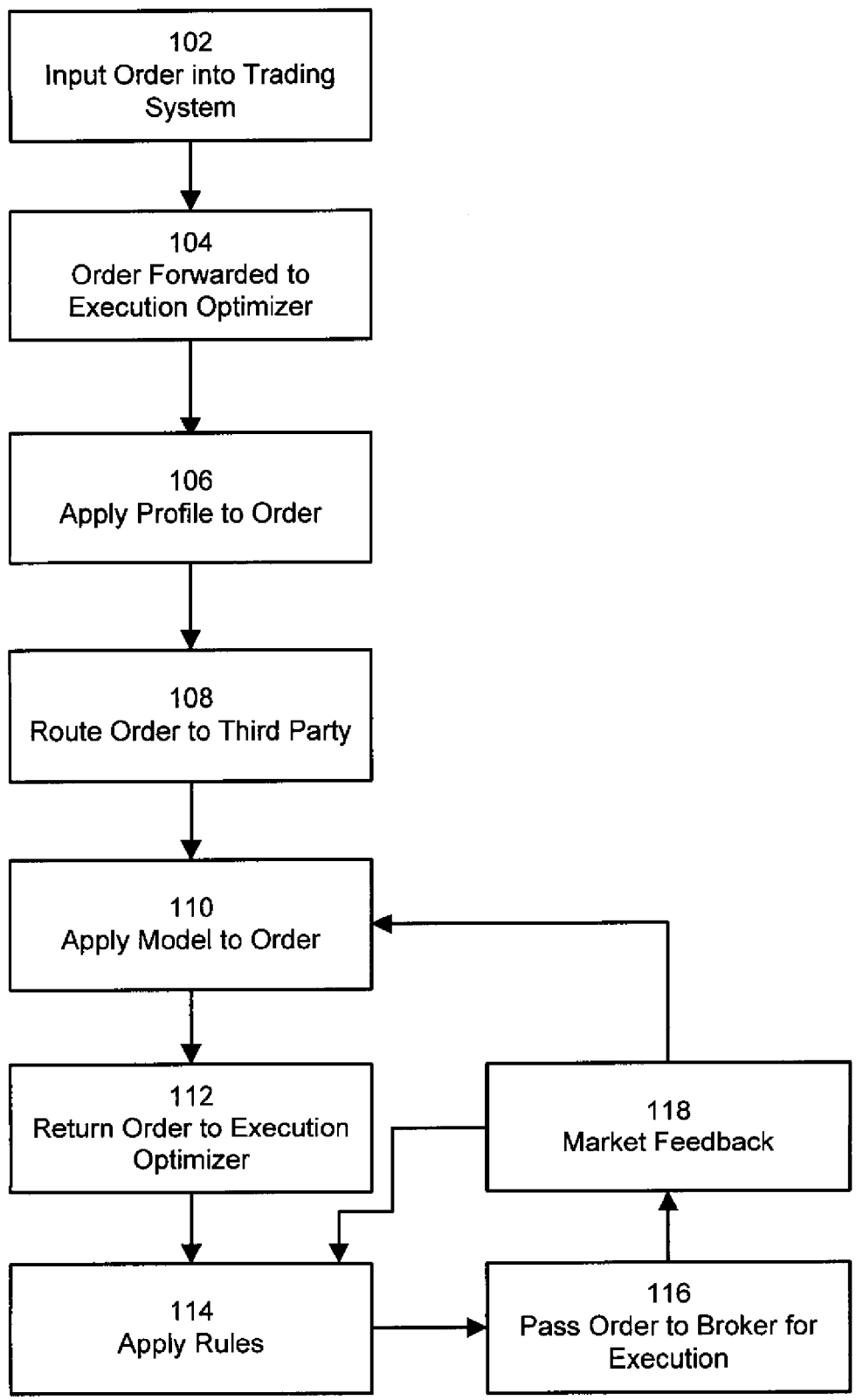
FIG. 1 is a flow chart of a method of executing of an order in accordance with exemplary embodiments.

These and other embodiments and advantages will become apparent from the following detailed description, taken in conjunction with the accompanying drawings, illustrating by way of example the principles of the various exemplary embodiments.

DETAILED DESCRIPTION OF THE PREFERRED EMBODIMENTS

It will be readily understood by those persons skilled in the art that the embodiments of the inventions described herein are capable of broad utility and application. Many embodiments and adaptations of the embodiments of the inventions other than those herein described, as well as many variations, modifications and equivalent arrangements, will be apparent from or reasonably suggested by the embodiments of the inventions and foregoing description thereof, without departing from the substance or scope of the invention.

Accordingly, while the embodiments of the invention have been described herein, in detail in relation to the exemplary embodiments, it is to be understood that this disclosure is illustrative and exemplary of embodiments of the invention and is made to provide an enabling disclosure of the invention. Accordingly, the subsequent disclosure is not intended to be construed to limit the embodiments of the invention or otherwise to exclude any other such embodiments, adaptations, variations, modifications and equivalent arrangements. While the various embodiments of the present invention are described in the context of execution optimization for orders in the context of security trading, the methods and systems described herein may be applied to other related items, such as other types of financial transactions.

Exemplary embodiments of the present invention provide systems and methods for optimizing the automatic execution of orders for securities, including application of profiles, models, and rules for the execution optimization of these orders. Exemplary embodiments provide a method and system that is designed to: (a) be adaptable, (b) be scalable, (c) be fault tolerant, (d) have speed of delivery, and (e) be configurable.

Application of embodiments of the present invention may be primarily in investment banking. However, one of ordinary skill in the art may appreciate application to other fields that use similar algorithms to automate execution of tasks. The use of the term "investment bank" or "financial institution" in the present application is used for illustrative examples, and is not meant to be limiting on the scope of the exemplary embodiments. Furthermore, the use of the term "securities" or "stocks" or "bonds" in the exemplary embodiments is used merely for illustrative examples is not meant in any way to be limiting upon the exemplary embodiments.

Exemplary embodiments involve the processing of orders, such as, but not limited to, orders for domestic securities. However, the embodiments described herein may be applied to any type of trading order. For example, embodiments may be applied to international trading orders or a combination of domestic and international trading orders.

An order may be placed for one or more securities. The order may be placed with an investment bank or similar entity. By way of non-limiting example, an order for 10,000 shares of stock may be placed with an investment bank. The shares may be all from the same entity or may be a combination of different entities. For example, the order may be for stock of a plurality of corporations, for example all blue chip corporations. The order may originate with a portfolio manager. The portfolio manager may input the orders into a trading system. The order may be input at a workstation coupled to a computer based network. The order may be processed by the trading system. The processing may include validation of the order. As part of the input, the portfolio manager may input certain parameters regarding the order. For example, the portfolio manager may set a flag for manual execution of the order indicating that the order is not to be automatically executed according to exemplary embodiments.

Following the trading system processing, the order may then be routed to an Execution Optimizer ("EO"). The EO may be part of a separate computer system coupled to the trading system, coupled by a computer based network to the trading system. Alternatively, the EO may be a module, such as a software module, resident in the trading system. The EO may be communicatively coupled to one or more databases that contain data according to exemplary embodiments.

Resident within the EO may be a series of profiles corresponding to a group of portfolio managers who are associated with and/or use the trading system. Each portfolio manager may have a profile. Each profile may be based upon a particular portfolio manager's trading habits and historical trading profile. Hence, the profile may be designed to capture the trading habits of that portfolio manager; that is, the profile is designed to replicate the behavior of the portfolio manager and the portfolio. Each profile may be updated periodically. A profile may be based on historical data of the particular portfolio manager's portfolio. For example, price slippage may be used as a metric within the portfolio manger's profile. The EO may apply a particular profile, corresponding to the portfolio manager. The application of the profile may be the appending, electronically, of the profile to the order. By way of another non-limiting example, a particular portfolio manager may be very aggressive with morning orders and may look to have such trades completed quickly, while tolerating pricing movement or market impact. This portfolio manager may then be more passive with afternoon trades. The profiles are designed to capture this behavior and provide the EO with the information to dictate how the orders are to be traded. According to exemplary embodiments, the portfolio manager does not typically trade the securities himself or herself but enters the orders based upon their investment strategies.

The order, with the profile, may be routed to a third party. In some orders, the order may be flagged for manual execution, in which case a trader will handle the order processing, without the order being routed to the third party. The routing may be the communication of the order over a computer network to the third party. At the third party, a prediction or performance model may be applied to the order, indicating trading parameters for the order. The prediction model may be a price prediction model. The prediction model may use the profile information as parameters for the prediction model. For example, the model may predict the upper and lower bounds on price for a sub-set of the total order and the timeframe to execute the order, as well as indicate how to trade the order. As another example, the model may be a performance model that predicts how the given security is going to perform in the present market. Referring back to the aforementioned order for 10,000 shares, the model may predict that 5,000 shares should be traded aggressively between a set of price bounds in the next 15 minutes. The remaining shares of the order may have a similar prediction. For example, the remaining 5,000 shares may be predicted to be traded in 1,000 share increments, not as aggressively, following the trading of the initial 5,000 shares.

Some orders may be routed to multiple third parties and have other models applied. These other models may be based on other parameters. For example, historical trading data, such as price slippage, for the stock in the order may be predicted. According to alternative embodiments, the order may have a model applied by the EO or another system associated with the investment bank. That is, the order may be internally processed without interaction with a third party. The order may have a flag set by the portfolio manager indicating how the order is processed.

The order, with the trading parameters from the prediction model, may be passed back to the EO. A rules engine associated with the EO may apply rules. These rules may be specific to the executing investment bank. For example, the rules may further break up the order into smaller size chunks based on the investment bank's broker's rules. The rules may select a broker based on various factors. By way of non-limiting example, the broker may be selected based upon the type of order, commission, trading history, and volume of the order. For example, the rules may select a broker based on the order being for a large cap fund. The order may then be passed to a selected broker for market trading. The selected broker may be determined by the rules. The order may be passed to the broker via direct paths for market trading. For example, the order may be forwarded to the broker by way of a direct market access pipe.

The EO has the capability to receive real time feedback on the order as it is traded. This feedback may be sent to the third party. The feedback may be used to update the prediction model and rules such that processing of the order may be adjusted in real time based on this market feedback. The rules engine can therefore apply iterative processing of the order. For example, based on feedback from the trading of the first block of share of the order, the trading parameters may be adjusted in real time. Brokers may be contacted to pull back orders or to cancel orders based on the revised information.

Manual intervention during the processing of the order may occur at any time up to the actual execution of the order. Further, the rules, models, and profiles applied to the order can be edited during the processing of the order.

FIG. 1 depicts a flow chart of a method of optimizing the execution of an order according to exemplary embodiments. Exemplary method 100 is provided by way of example, as there are a variety of ways to carry out the methods disclosed herein. The method 100 as shown in FIG. 1 may be executed or otherwise performed by one or a combination of various systems, such as a computer implemented system. Each block shown in FIG. 1 represents one or more processes, methods, and/or subroutines carried out in the exemplary method 100. Each block may have an associated processing machine or the blocks depicted may be carried out through one processor machine. While the exemplary method 100 may use an order from a client for stocks as an example of optimizing an order, the method shown in FIG. 1 may be applied to other types of orders, such as other securities or other types of financial transactions.

While the method of FIG. 1 illustrates certain steps performed in a particular order, it should be understood that the embodiments of the present invention may be practiced by adding one or more steps to the processes, omitting steps within the processes and/or altering the order in which one or more steps are performed.

The method of FIG. 1 may commence with receipt of an order at block 102. An order is input into a trading system. For example, a portfolio manager may input an order into the trading system. The trading system may be one as known in the art. For example, the Longview Trading System ("LVTS") may be used. Other trading systems or combinations thereof may be used. It should be appreciated that other persons may input the order, such as a broker or a person working for or associated with the portfolio manager. The placing and execution of all order flow may be handled by a particular application, module, or system. For example, the EO may handle the placing and execution of all order flow. In alternative embodiments, the FIX engine application may be used. Other applications, modules, or systems, or combinations thereof may be used.

The order may be of any type. For example, the order may be for a purchase or transaction relating to one or more securities. For example, the securities may be domestic stocks or bonds. According to exemplary embodiments, the investment bank may originate the order. For example, the investment bank, such as JPMorgan Chase Bank, N.A., may have funds invested therewith by one or more clients. The clients may authorize the investment bank, through the portfolio manager to invest those funds in accordance with an investment strategy. The orders entered into the trading system may be placed by personnel internal to the investment bank. For example, the portfolio manager or personnel associated therewith. Orders may also be received from a third party, for example a private bank associated with the investment bank, through an automated generation process that may follow a designated investment strategy associated with the investment bank. Alternatively, the order may be placed by an investment team according to an investment strategy. The order may be entered into the trading system. For example, a person, such as the portfolio manager or an investment assistant, may enter the order into the trading system. According to exemplary embodiments, a third party may enter the order. For example, the order may be relayed to the third party for entry into the trading system. In certain cases, the order may be automatically entered into the trading system. For example, through an internet site. The order may be directly fed into the trading system from the internet site without external intervention. It should be appreciated that combinations of both automatic and manual entry for the order are possible.

Upon entry into the trading system, the order may have certain options selected that may influence the order execution. Further, upon entry of the order into the system, the person or system entering the order may configure certain settings and/or flags relating to the order. In the case of a system entering the order, the certain settings and/or flags may be automatically configured by the system entering the order. Such settings and/or flags may determine how the order is processed within the trading system. For example, a flag may be set on the order which disables autorouting for the order. In such cases, the order may immediately go into an appropriate queue for manual processing. Generally, the order may be autorouted and not indicated for manual processing by default. Additionally, an order may have special instructions and/or constraints associated therewith. The special instructions and/or constraints may be entered with the order. Alternatively, the special instructions and/or constraints may be standing rules previously agreed upon and programmed into the trading system prior to the entry of the order. The special instructions and/or constraints may be applied to all orders associated with or originating from a particular client or customer. For example, a special instruction for all orders from client A may be to disable autorouting. According to exemplary embodiments, only certain types of orders may have the methods described herein applied thereto. For example, the certain types of orders may include: large cap, mid/small cap active and private bank (single orders) orders, structured equity orders, contingent orders, United States domestic equity securities orders, and international orders. Other types of orders, upon entry, may be automatically routed to a manual queue, bypassing the automatic execution system.

Following entry of the order into the trading system at block 102, a series of processing checks may be performed on the order to ensure that the order is properly entered and ready for execution by the system and method according to exemplary embodiments.

At block 104, the order is forwarded to the execution optimizer or EO. The order may be forwarded by the trading system. The order may be forwarded automatically after entry into the trading system. The order may require a physical action to be forwarded. For example, the portfolio manager may select an option to forward the order. According to exemplary embodiments, the order may be flagged as either an error or a warning. Both cases may be flagged for further review. An error order may be not continue through the method described herein. For example, the error order may not be forwarded to a third party for application of the prediction model as described herein. A warning order may be allowed to continue.

At block 106, a profile is applied to the order. The application of the profile may consist of the profile being appended to or associated with the data of the order. For example, the profile may be electronically appended to the data file containing the order. Resident within the EO may be a series of profiles corresponding to a group of portfolio managers who use the trading system. Each portfolio manager may have a profile. Each profile may be based upon a particular portfolio manager's trading habits and historical trading profile. Hence, the profile may be designed to capture the trading habits of that portfolio manager; that is, the profile is designed to replicate the behavior of the portfolio manager if he was personally executing the order. Each profile may be updated periodically. For example, portfolio manager information may be pulled from the order system at set intervals throughout the day. This data may be used to update the profiles at set intervals. A profile may be based on historical data of the particular portfolio manager's portfolio. For example, price slippage may be used as a metric within the portfolio manager's profile. The EO may apply a particular profile, corresponding to the portfolio manager. The application of the profile may be the appending, electronically, of the profile to the order. The EO may use an events processing system. For example, the EO may use Streambase as the events processing system.

At block 108, the order is routed to a third party. The order may be routed electronically to the third party. For example, the third party may be a vendor that supplies services, such as model predictions or algorithm application to orders. The model applied may be proprietary to the third party. For example, Automated Trading Desk ("ATD") may be the third party and provide one or more price prediction models to apply to orders routed to them. Other third parties may be used. A combination of prediction models may be applied to the order. In some embodiments, this block may be omitted. That is, the method 100 may proceed to block 110 and skip block 108 entirely.

At block 110, a model is applied to the order. The model may be of any kind. For example, the model may be a price prediction model that may output a price range, including an upper and lower price bound, a trading style, such as aggressive, a time frame to trade the order, and an particular size for the order that is a sub-set of the total order size. For example, for an order for 3,000 shares of company X, the model may output that this order should be traded in 500 share blocks, between $6.50 and $7.38, aggressively, in the next 10 minutes. The model may be a performance model for the security. It should be appreciated that other model types and predictions are possible. For example, a model which uses basis points or bid offer spread may be used. It should be appreciated that such models may be proprietary in nature.

The model may apply the profile in determining the prediction. For example, the data contained in the profile may be used as parameters for the model.

At block 112, the order is returned to the execution optimizer. The order may be returned with the model prediction included.

At block 114, a set of rules is applied to the order. A rules engine associated with the EO may apply rules. These rules may be specific to the executing investment bank. For example, the rules may further break up the order into smaller size chunks based on the investment bank's broker's rules. The rules may select a broker based on various factors. By way of non-limiting example, the broker may be selected based upon the type of order, commission, trading history, and volume of the order. For example, the rules may select a broker based on the order being for a large cap fund.

The EO may determine the strategy and the broker. This data may be passed to the trading system and then out to the executing destination. The data may be passed directly from the EO to the third party. The trading system may create the placements and receive the fills from the brokers. The trading system may publish this data back to the prediction engine through the EO.

At block 116, the order is passed to a broker for execution. The order may be passed with appropriate instructions for execution based on the applied rules above. The broker may then trade the order on the market. The order may be passed to the broker via direct paths for market trading. For example, the order may be forwarded to the broker by way of a direct market access ("DMA") pipe execution management system ("EMS"). It should be appreciated that many direct access pipes are provided by third party vendors. For example, the Lava Execution Management System is a direct market access product provided by a third party. The order may be routed from the EO to the trading system and them to the brokers through the designated pipes.

At block 118, feedback is received from the market. The feedback may be received in real time. For example, the EO has the capability to receive real time feedback on the order as it is traded. This feedback may be sent to the third party at block 108. The feedback may be used to update the prediction model and rules such that processing of the order may be adjusted in real time based on this market feedback. The rules engine can therefore apply iterative processing of the order. For example, based on feedback from the trading of the first block of share of the order, the trading parameters may be adjusted in real time. Brokers may be contacted to pull back orders or to cancel orders based on the revised information. The brokers may provide feedback on order fills. The feedback may be received by the trading system and passed to the EO.

Further, according to exemplary embodiments, the order may be cancelled, amended, or removed from automatic execution at any point in the process, up to the actual execution of the order. A user may enter an appropriate command into the EO or trading system to perform such actions. If the user enters a command to cancel, amend, or remove the order from automatic execution, and such order fails, the user may be provided with an appropriate message indicating the reason for the failure.

Figure 2:
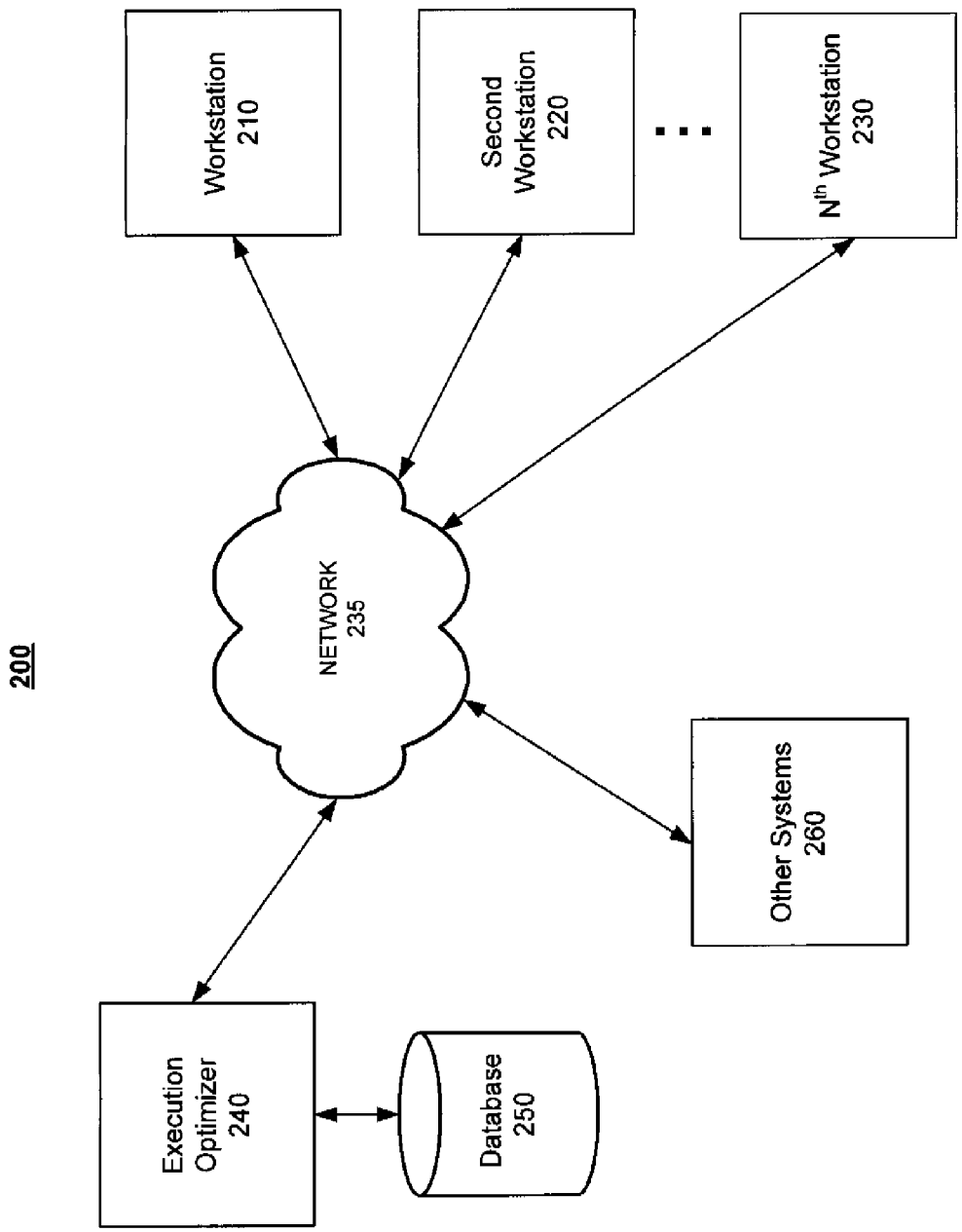
FIG. 2 is a system for executing of an order in accordance with exemplary embodiments.

FIG. 2 is a system for optimizing the execution of an order, according to an exemplary embodiment of the present invention. The system 200 may provide various functionality and features associated with execution optimization. More specifically, the system 200 may include a workstation 210, a second workstation 220, and an Nth workstation 230, a network 235, execution optimizer 240, a database 250, and other systems 260. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that the system 200 may be integrated into and run on a computer, such as a general purpose computer which may include a processing machine which has one or more processors. Such a processing machine may execute instructions stored in a memory to process the data. The system 200 may be integrated into and run on one or more computer networks which may each have one of more computers associated therewith.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

According to exemplary embodiments, the system 200 may be configured to carry out the method 100 as described above. The system 200 may have a workstation 210 associated therewith. A second workstation 220 and an Nth workstation 230 may be further associated with the system 200. The workstations 210, 220, and 230 may each be a processing machine, such as a general purpose computer. Each workstation 210, 220, and 230 may include software and/or modules to implement the method 100 according to exemplary embodiments. Each workstation 210, 220, and 230 may provide processing, display, storage, communications, and execution of commands in response to inputs from a user thereof and respond to requests from the software and/or modules. The workstations 210, 220, and 230 may each serve as a client side. Each workstation 210, 220, and 230 may be a fat client, such that the majority of the processing may be performed on the client. Alternatively, the workstations 210, 220, and 230 may each be a thin client, such that the majority of the processing may be performed in the other components of the system 200. The workstations 210, 220, and 230 may be a part of the trading system according to exemplary embodiments. Further, the workstations 210, 220, and 230 may be configured to perform other functions and processing beyond the method 100. The workstations 210, 220, and 230 may each be a part of a larger system associated with the investment bank. That is, the workstations 210, 220, and 230 may be multi-functional in operation.

The workstations 210, 220, and 230 may be communicatively coupled to a network 235. Network 235 may be a computer based network, comprising one or more servers and/or computer processors. For example, network 235 may be the internet. Information and data may be exchanged through the network 235 between the various components of the system 200. In alternative embodiments, the network 235 may be a local area network within the investment bank. It should be appreciated that the network 235 may be a combination of local area networks, wide area networks, and external networks.

The execution optimizer 240 may be communicatively coupled to the network 235. The execution optimizer 240 may perform operations associated with the establishment, editing, and application of the profiles and rules according to exemplary embodiments. The execution optimizer may receive the order from the trading system, apply the profile, receive the order from the third party, apply rules to the order, and pass the order for execution. The execution optimizer 240 may receive feedback, in real time, from the market, and disseminate and apply the data received as required. The execution optimizer 240 may perform other functions. In some embodiments, the execution optimizer 240 may be a part of the same system as the workstations 210, 220, and 230. The execution optimizer 240 may consist of one or more servers and/or general purpose computers, each having one or more computer processors associated therewith.

The execution optimizer 240 may have a database 250 communicatively coupled thereto. The database 250 may contain the rules, profiles, and other data used by the system 200. Additional information maybe contained therein related to the operation and administration of the system 200. The database 250 may include any suitable data structure to maintain the information and allow access and retrieval of the information. For example, the database may keep the data in an organized fashion. The database 250 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein. The database 250 may be more than one database. The database 250 may be associated with multiple components of the system 200.

The database 250 may be stored in any suitable storage device. The storage device may include multiple data storage devices. The multiple data storage devices may be operatively associated with the database 250. The storage may be local, remote, or a combination thereof with respect to the database. The database 250 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fibre Channel SAN, a common Internet File System (CIFS), network attached storage (NAS), or a network file system (NFS). The database may have back-up capability built-in. Communications with the database 250 may be over a network, such as the network 235, or communications may be over a direct connection between the database 250 and the execution optimizer 240, as depicted in FIG. 2. Data may be transmitted and/or received from the database 250. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data.

The system 200 may have other systems 260 associated therewith. These other systems 260 may include various data collection and support systems used by the investment bank to carry out its functions.

Figure 3:
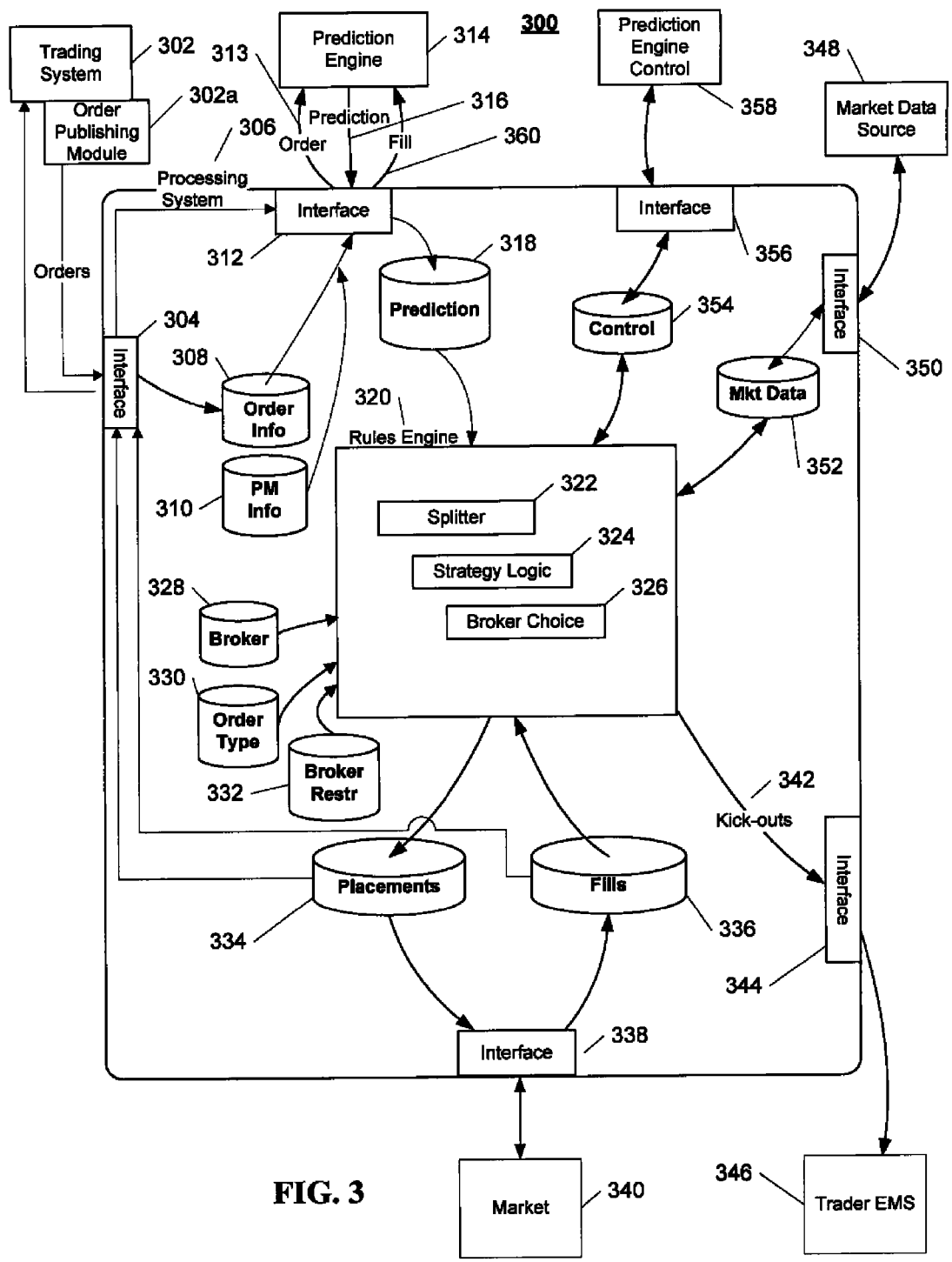
FIG. 3 is a flow chart of a system for executing of an order in accordance with exemplary embodiments.

FIG. 3 provides a flow chart for a system according to exemplary embodiments. The system 300 may provide various functionality and features associated with execution optimization. More specifically, the system 300 may be configured to implement the methods for execution optimization described herein, such as the method 100 described above. The system 300 may contain the various components depicted in the system 200. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. While the system 300 is depicted with data flowing in a particular manner between the various components, it should be appreciated that a variety of data flow paths may be realized and the arrows in the system 300 showing the flow of data are exemplary only. For example, some arrows may indicate a one way direction of flow and these arrows may be configured for a two way direction of flow. Further, data may be routed between in the various components in a variety of paths and manners.

It should be appreciated that the system 300 may be integrated into and run on a computer, such as a general purpose computer which may include a processing machine which has one or more processors. Such a processing machine may execute instructions stored in a memory to process the data. The system 300 may be integrated into and run on one or more computer networks which may each have one of more computers associated therewith. The system 300 may have a number of databases associated with it. It should further be appreciated that the system 300 may be associated with multiple computers or servers and multiple computer networks.

A trading system 302 may be used to input an order or may receive an order. For example, a portfolio manager may input an order into the trading system or an order may be electronically communicated to the trading system from an external source, such as a computer network. The trading system may be one as known in the art. For example, the Longview Trading System ("LVTS") may be used. Other trading systems or combinations thereof may be used. It should be appreciated that other persons may input the order, such as a broker or a person working for or associated with the portfolio manager. Other applications, modules, or systems, or combinations thereof may be used. The order may be communicated to an interface 304. The interface 304 may be associated with a processing system 306. As described herein, the order may be of any type. For example, the order may be for a purchase or transaction relating to one or more securities.

The trading system 302 may have an order publishing module 302a associated therewith. The order publishing module 302a may have two mechanisms to publish orders. For example, the two mechanisms may be an initialize process to start-up in the morning or re-synch during the day and a mechanism to publish just changes to the orders throughout the day. According to exemplary embodiments, the order in the order publishing module may be flagged as either an error or a warning. Both cases may be flagged for further review. An error order may be not continue through the method described herein. For example, the error order may not be forwarded to a third party for application of the prediction model as described herein. A warning order may be allowed to continue.

The trading system 302 may have symbol information associated with it for use with the orders. The symbol information may contain basic symbol information that is required for an order to determine the correct order categorization by the prediction engine. For example, the symbol data may include the stock's previous closing price, the average daily volume, the median inside size, and the primary market center. According to exemplary embodiments, an initial load each day may contain the symbol data for all symbols traded in the last six months. For each order received, a check is performed to see if the symbol from the order is in the symbol data. If it is not, it may be added to the data. A function of the symbol data may be to ensure that appropriate market data is subscribed to in order to update the various databases and rules used for the handling of orders as described herein. The order publishing module 302a may perform a check on the symbol data during the processing of the order. It should be appreciated that the symbol information may be associated with the processing system 306 as described herein.

Following transmission of the order to the interface 304, a series of processing checks may be performed on the order by the processing system 306 to ensure that the order is properly entered and ready for execution by the system and method according to exemplary embodiments. The order and its associated information is sent to an order information module 308. The order information may be stored within the order information module 308 for future use by the processing system 306. Once the validation is performed on the order, the order may have a portfolio manager ("PM") profile associated therewith. The PM information module 310 may perform this function. The PM information module 310 may store and process the PM profile as described herein.

The PM information module 310 may contain portfolio manager fit data. The portfolio manager fit data may contain all of the prediction coefficients for each portfolio manager and order sub-type. This data may be accessed by or associated with the prediction engine 314 in order to generate new predictions upon order entry. A database may hold historical prediction information, in order to facilitate the traders looking back at previous performance. The database may hold data for a given period of time historically, along with current day prediction information on orders that have been completed or canceled.

The portfolio manager fit selector may listen to each order block that enters the system 300 and may selects the appropriate fit from the table of portfolio manager fits that may be loaded each day. The portfolio manager fit selector may be associated with the prediction engine 314. The portfolio manager fit selector may publish this information to a stream, where it may be used as the base for a backup strategy, in case the primary strategy ever becomes unavailable. The portfolio manager fit selector may:

Load into a table the set of PM fits for that day
Listen to new orders and select the fit for that order, based on appropriate factors.
Publish this fit selection to a table, mapped to the order.
Listen for orders for a given block and update the current fit table as required.

The order with the PM profile may be forwarded to an interface 312. The order and the PM profile information may be entered into a prediction engine 314, as shown by the arrow 313. The information may be forwarded to a third party, which manages the prediction engine. For example, the prediction engine may be associated with and/or proprietary to a third party. In some embodiments, the prediction engine may be part of the processing system 306 and may be associated with, managed by, and/or proprietary to the investment bank or other institution that has the processing system 306. The prediction engine 314 may apply a proprietary model to the order. For example, Automated Trading Desk ("ATD") may be the third party and provide one or more price prediction models to apply to orders routed to them. Other third parties may be used. A combination of prediction models may be applied to the order. In alternative embodiments, the prediction engine may be associated with the processing system; that is, the prediction engine may not be associated with a third party. In some embodiments, this block may be omitted. That is, the order may be routed to a rules engine for further processing as described below.

The prediction engine 314 may apply the model to the order. The PM profile information may be used by the prediction engine as configuration data for the model to tailor the output based upon the PM profile. Upon completion of the model application, the order is returned to the execution optimizer as shown by the arrow 316. The order may be returned with the model prediction included. In some embodiments, the order data may not be sent back since the processing system 306 may store the order data and only the prediction information need be returned. The prediction information may be communicated to the interface 312. The prediction data may be forwarded to the prediction module 318 for additional processing. Upon completion of this processing, the prediction may be sent to a rules engine 320. The rules engine may have various components, includes a splitter 322, a strategy logic module 324, and a broker choice module 326. The rules engine 320 may form the core of the EO.

The prediction engine 314 may have an order performance calculator which may track order performance across various metrics and generate comparative performance statistics. The order performance calculator may process order and market data and generate absolute and comparative data points for each current live order. This information may be provided to the processing system 306. This data may be provided by electronic messaging.

The system 300 may be configured to allow traders to process orders with many models and using many different broker venues. New models may be moved in, existing models may be adjusted, and the models may be run simultaneously. Simulations may be run using the models. For example, the system may be run in a simulation mode instead of a production mode. The interface 312 may provide this scalability.

The rules engine 320 may apply a set of rules to the order. For example, the rules may further break up the order into smaller size chunks based on the investment bank's broker's rules. The rules may select a broker based on various factors. By way of non-limiting example, the broker may be selected based upon the type of order, commission, trading history, and volume of the order. For example, the rules may select a broker based on the order being for a large cap fund. The various components of the rules engine 320 may perform the logic of applying the various rules. The application of the rules may take into account the prediction from the model. Various data sources and modules may support the rules engine 320, including a broker module 328, a order type module 330, and a broker restriction module 332. These modules may be databases or may have databases associated therewith.

The broker module 328 may contain a listing of eligible brokers. The broker restriction module 332 may be work in concert with the broker module 328 to provide the necessary broker information for order execution. The data from the broker module 328 and the broker restriction module 332 may be loaded once a day, for example, upon system start-up in the morning.

The rules engine 320 may have a database holding historical order performance information. This database may include statistics. For example, the statistics may include the slippage, percentage of volume, and average price along with comparative numbers such as predicted performance versus actual performance, performance versus vwap, etc. This database may hold both historical information for a given period of time and current day information on orders that have been completed or canceled.

The rules engine 320 may interpret prediction information and other information. The rules engine module may provide: a determination of order split using the splitter 322, a selection of a strategy using the strategy logic module 324, and selection of a broker using the broker choice module 326. The rules engine may be able to process all incoming order flow and determine whether it should be handled manually or in an automated fashion. The rules engine may handle the trading for all automated order flow.

The splitter 322 may be included in the rules engine 320 or within the system 300 according to exemplary embodiments. The splitter 322 may make a determination regarding which trader or trading strategy should handle the order, the trading strategies which make decisions regarding order placement and handle order management, the broker eligibility process which identifies which brokers are available to send orders to, and the portfolio manager fit selector, which may select the correct fit to apply to an order upon order generation. The purpose of the splitter 322 may be to provide a process through which orders/blocks can be diverted either to traders or to the automated system. It may check each incoming order/block against its underlying attributes and the pre-defined parameters and may then either send the order back to the trader or assign it to the appropriate trading strategy. The splitter 322 may have the follow requirements:

Reading in new orders coming into the system.
Loading a table of restricted securities.
Loading a table of security Average Daily Volumes ("ADVs") for a certain time period, for example, twenty (20) day ADVs.
Checking to see if the order is in the list of restricted symbols or if the order is greater than X percent of ADV.
Allowing the ADV percentage threshold to be a configurable value that can be reloaded intraday.

Sending orders which meet or exceed the above criteria to traders. All other orders may be directed to the automated trading strategies.

Processing each order in no more than two (2) milliseconds.

The strategy logic module 324 may have a trading strategy framework to makes decision regarding how each order which is assigned to it should be handled and then generates the appropriate placements. Each trading strategy may have the ability to listen to its own set of inputs and may have multiple internal logic sets which correspond to different modes of action within the overall strategy. Additionally, each strategy may maintain awareness of open placements, open cancels, and filled shares for each block it is executing. The trading strategy framework may have the following requirements:

Support multiple trading strategies, each with its own list of assigned orders.

Support an underlying set of modules with functionality that may be reused by each trading strategy. This set should include:
Model Control
Market Data Processing
Prediction Data Processing
Management of broker order placement and cancellation Further, each trading strategy may:
Consist of multiple sub strategies.
Process new orders that have been assigned to the strategy.
Aggregate block information across all orders in the block within the strategy.
Read market data (best bid, best ask, best bid size, and best ask size) from the market data stream and reconsider decision logic on each update.
Read prediction data (block ID, price, size, strategy) from the prediction stream and reconsider decision logic on each update.
Make placement and cancel decisions at times triggered by the events listed below. The results of these decisions should placements and cancels which are generated and submitted to a stream for processing by the FIX engine.
Internally track the status of placements and cancels submitted.
Process each event and related decision calculations within a set period of time, for example, two (2) milliseconds.
Listen to fills generated from placements made by the strategy and reconsider its decision logic with each update.

The broker choice module 326 may manage a broker eligibility process using broker priority lists, may assist in the mapping of brokers to their available order types, and may manage filtering for broker exclusions. The data from the broker module 328 and the broker restriction module 332 may be used as part of this process. The broker eligibility process may sit as part of the library for the trading strategies, which may call into it when making placement decisions. The broker eligibility process may:

Read in a list or table of brokers and weightings/rankings.
Read in a list or table of available order types for each broker.
Read in a list or table of broker exclusions.
Support being called from a trading strategy, which may supply security ID and trading category.
Return to the trading strategy a list of broker and order type pairs for the eligible brokers, given the attributes submitted to it by the trading strategy.
Handle this processing in no more than a set period of time, for example, five hundred (500) microseconds.

The rules engine 320 may process various events. Various parts of the rules engine 320 may process different events. In some embodiments, the rules engine 320 may process each event with a single section. The rules engine 320 may use other systems or modules to provide the processing for certain events. While the actions herein may be described in a particular sequence, it should be appreciated that the actions may be performed in any order. Further, certain actions or sequences may be omitted.

When a new block or first order enters, it may be directed to the splitter 322. The splitter 322 may first retrieve and apply additional attributes to the block which are not already contained in the block message. Next, the splitter 322 retrieves and iterates over its filtering parameters, leading to a determination of which trader or trading strategy is appropriate. The splitter 322 may submit the order to the correct system. If the order is going into the automated system, the splitter may send a new trading strategy assignment message which may be read by the trading strategy and written to the trading strategy assignment table. The appropriate trading strategy may receives the assignment message and retrieve the relevant market data and prediction information. The trading strategy then may iterate through its decision logic. If it chooses to generate placements, it calls the broker table to retrieve the correct broker. The trading strategy may send the placement message to the appropriate stream and may store the placement in its open placements data structure.

The portfolio manager fit selector may receive the new block information, retrieves any necessary factors, and then may select the appropriate fit from the portfolio manager fits table. It may then publish this fit to the current fits table with the fit information and the associated block ID.

When a new order, not first in block, enters, it may also go to the splitter 322. The splitter 322 may check the trading strategy assignment table for the order's associated block. It may then transmit the order to the appropriate trading strategy or trader. The trading strategy may process the new order and recalculate total values for the block. It may retrieve a new prediction. It may then iterate through its decision logic and determine whether any cancellations or new placements are required and may proceed with any actions necessary.

The portfolio manager fit selector may recalculate the attributes of the block. It may then reselect the appropriate fit for the block and may update the current fits table with the new selection.

As shown by a placements module 334, the order may passed to an interface 340 for execution on the market after being processed by the rules engine 320. The order may be passed to a broker as determined by the rules engine 320. The order may be passed with appropriate instructions for execution based on the applied rules above. The broker may then trade the order on the market. The order may be passed to the broker via direct paths for market trading. For example, the order may be forwarded to the broker by way of a direct market access ("DMA") pipe execution management system ("EMS"). It should be appreciated that many direct access pipes are provided by third party vendors. For example, the Lava Execution Management System is a direct market access product provided by a third party. Fill information may be received at a fills module 336 based on the placement from the brokers. The trading system may publish this data back to the prediction engine through the processing system 306 through various paths as shown.

As shown in the system 300, both the placements module 334 and the fills module 336 may provide information back to both the trading system 302 and the prediction engine 314. This information may be communicated through the use of the interface 304 and the interface 312. For example, fill information may be forwarded to the prediction engine 314 by the arrow 360 from the interface 312.

As shown by the path 342, some orders may be kicked out to an interface 344 with a Trader Execution Management System ("EMS") 346. These may be orders that require further manual execution by a trader.

Feedback may received from the market 340 through a market data source 348. The market data source 348 may be a third party who collects, organizes, and analyzes market data to support investment banking function. For example, a market data feed from Reuters may be used. Market data may be received from the source 348 through an interface 350 and forwarded to a market data module 352. The feedback may be received in real time. This market data may serve as a form of feedback regarding the order execution. This feedback may be sent to the third party associated with the prediction engine 314. The feedback may be send through a control module 354 through an interface 356 to a prediction engine control module 358. The feedback may be used to update the prediction model and rules such that processing of the order may be adjusted in real time based on this market feedback. The rules engine can therefore apply iterative processing of the order. For example, based on feedback from the trading of the first block of share of the order, the trading parameters may be adjusted in real time. Brokers may be contacted to pull back orders or to cancel orders based on the revised information. The brokers may provide feedback on order fills.

Market data updates may be defined as a change in the best bid, best ask, best bid size, or best ask size. The trading strategy may choose to ignore some of these events (most typically the best bid/ask size changes). If it is an actionable event, the trading strategy may retrieve the current prediction, consider all blocks, examine open placements in the symbol with the change, and may make any cancellation or placement actions required.

Prediction updates may occur any time a new prediction is published for a block. Upon publication, the trading strategy may re-evaluate the block related to the prediction, examine any open placements for that block, and make any placement or cancellation adjustments required.

The control module 354 may be interface with the prediction engine control 358. The rules engine 320 may use the control module 354 in order to facilitate real time control and adjustment of the various pieces of the rules engine and to facilitate corrective action when there may be a system issue. The control module 354 and/or the prediction engine 358 may:

- Listen to the model control stream
- Filter for only those messages pertaining to the specific process in which it is currently functioning.
- Enable/disable/adjust the functionality of the process for which it is listening to model control.
- Verify that the action has been taken correctly.
- Submit back to the model control stream a verification of the request action.

Further, according to exemplary embodiments, the order may be cancelled, amended, or removed from automatic execution at any point in the process, up to the actual execution of the order. If such an action is performed on an order, the order may be sent through the kick-out 342 to the trader EMS 346.

Figure 4A:
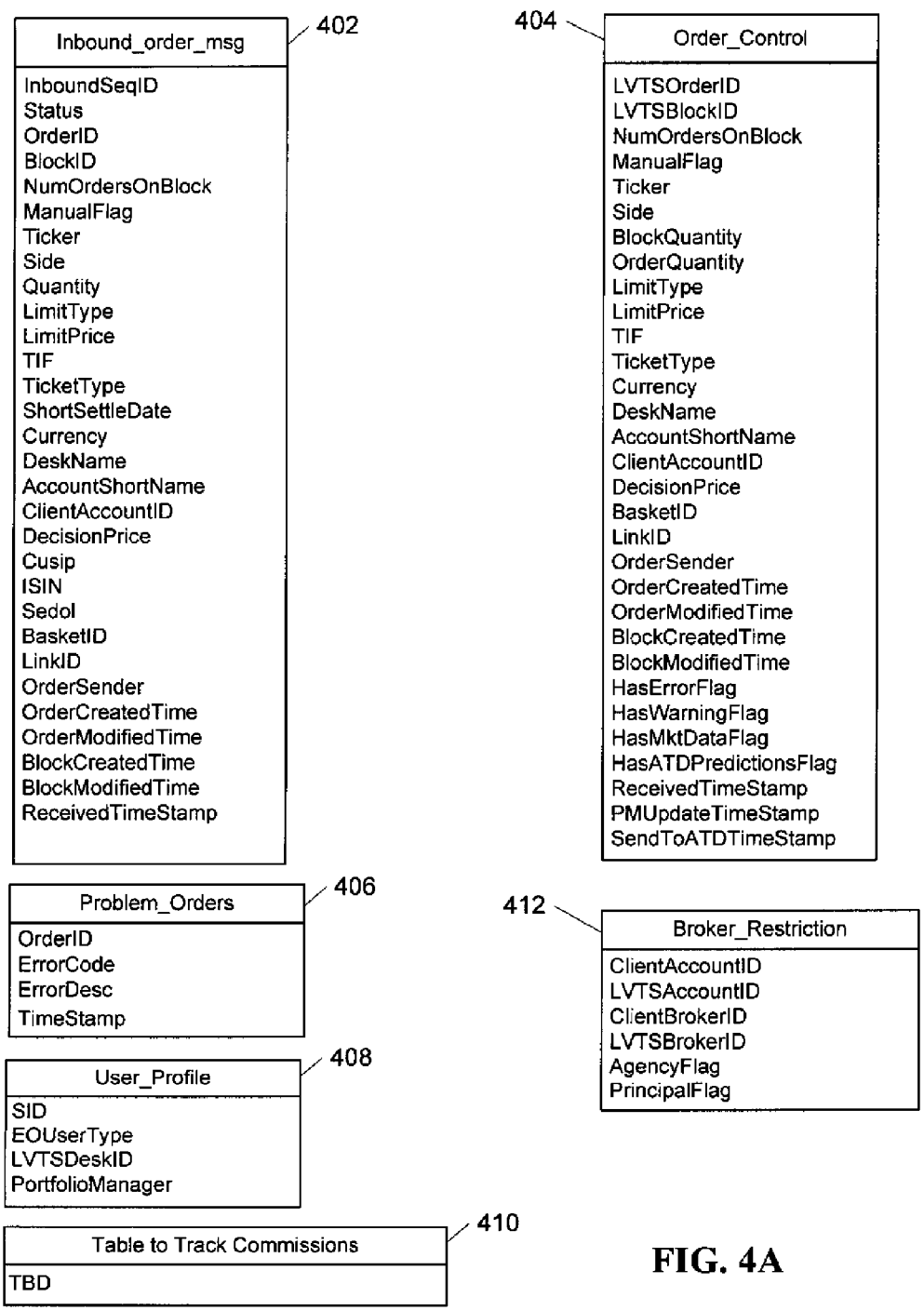
Figure 4B:
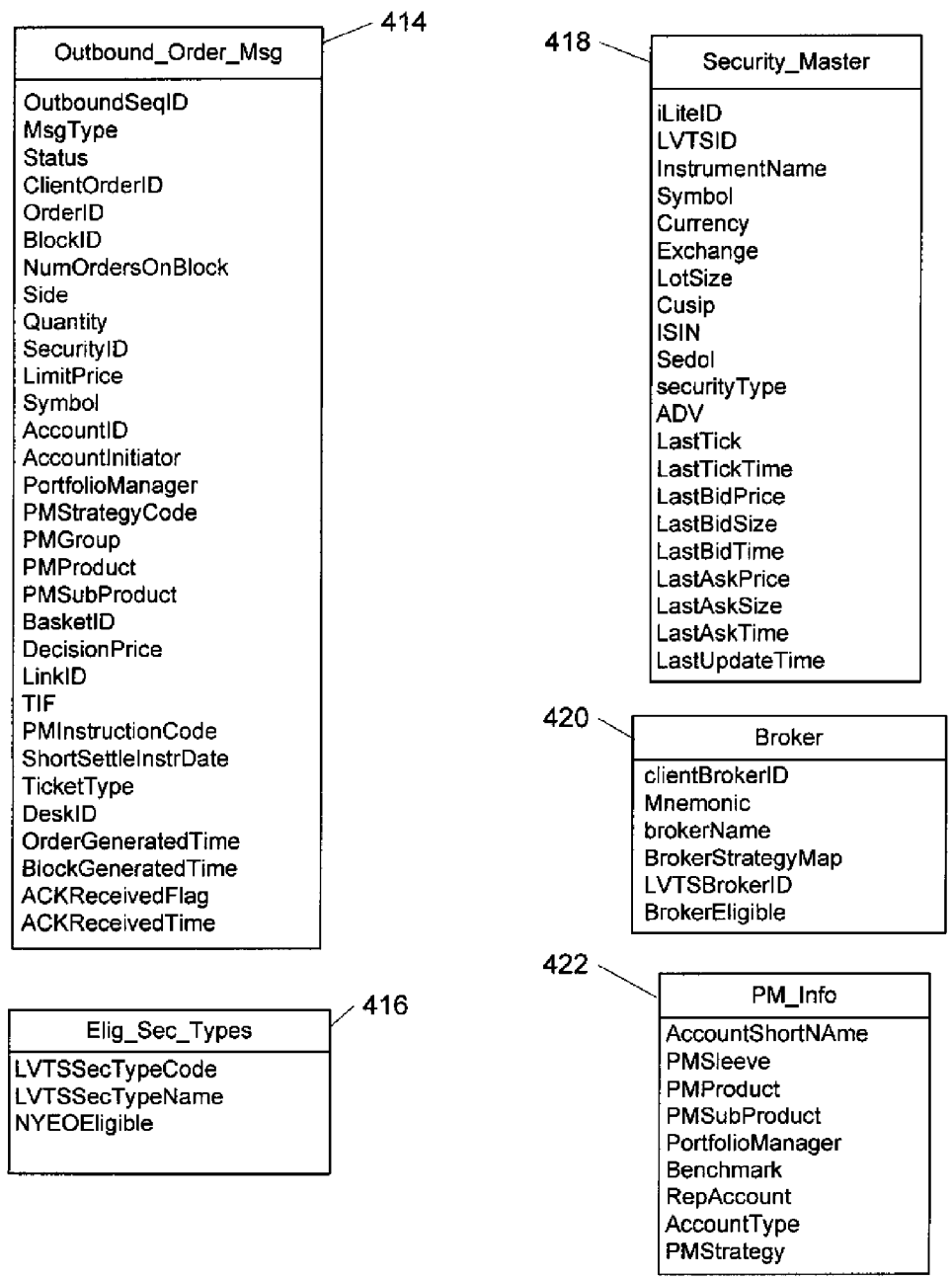
Figure 4D:
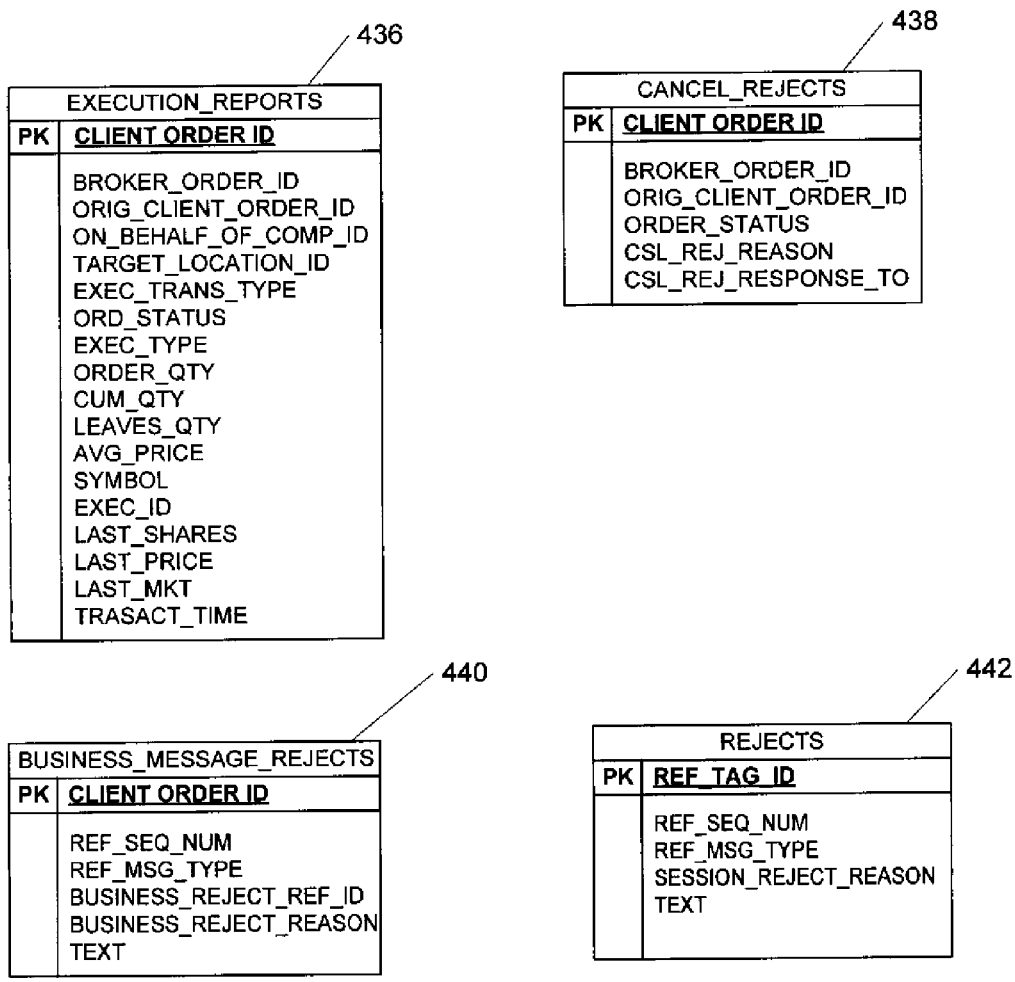

FIG. 4, as shown in FIGS. 4A-D, provides a listing of data associated with messages routed as part of the various stages of order processing as described herein. These data fields are provided by way of non-limiting example and it should be appreciated that additional data fields may be used. Further, a sub-set of these data fields may be used with certain orders; that is, some orders may not use all of the data fields. Additional data fields may be added to orders as required. The system may have reserved data fields for this additional data. Further, the system may have free form data fields in which personnel associated with the order may enter additional data as required. It should be appreciated that various combinations of the data fields may be used and new data fields may be added. The data fields may be appended with descriptive information to indicate the system or portion of the system that the data is associated with. For example, Inbound_order_msg may be appended with the prefix LVTS to become LVTS_Inbound_order_msg indicating that the field is associated with the LVTS. The various data fields are listed under a header name, this header name may used as a initial field label in a data stream and the various data fields may follow the header. The header name may serve as a partition to assist in parsing the data associated with the order.

Blocks 402, 404, 406, 408, 410, 412, 414, 416, 418, 420, and 422 are data fields used in relation to order flow. Blocks 424 and 426 are data fields associated with predictions from the prediction engine, for example, the prediction engine 314. Blocks 428, 430, 432, and 434 are data fields associated with order placements, for example the placements module 334. Finally, blocks 436, 438, 440, and 442 are data fields associated with order fills, for example the fills module 336.

FIGS. 5 through 8 show embodiments of graphical user interfaces ("GUIs") in accordance with exemplary embodiments. These GUIs are shown by way of non-limiting examples. The GUIs may provide a user interface for the systems described herein, such as the EO. Additional systems may be accessed from the GUIs shown. The GUIs may be accessed through a computer, for example, the workstation 210 as shown in the system 200 of FIG. 2. As shown in FIG. 2, the workstation 210 may be coupled to a network 235. The GUI may include the following:

- a tool to view and manage order flow. A trader may be able to monitor how orders are being executed, with whom, and the end-to-end throughput;
- a tool to place an order into or take an order out of the automated processing and control the level of aggressiveness on a particular order;
- a tool to create and maintain rules;
- a tool to maintain processing data; and
- a tool to maintain and monitor a financial information exchange ("FIX") engine.

Referring to FIG. 5, the elements of a GUI 500 are shown. While illustrative blocks, windows, menus, or components are shown, these illustrative blocks, windows, menus, or components may be arranged differently or modified in presentation. A menu selection bar 502 provides drop down menus to perform various actions and functions associated with the system. On the left hand side of the GUI 500, the blocks menu item 504 may provide a tree-like menu structure to provide access to order data associated the various traders (via heading 506) and portfolio managers ("PMs") (via heading 508) that are associated with or active in the system. Each of the headings 506 and 508 may be expandable to provide greater fidelity and control over the data selection. For example, the headings 506 and 508 may be expanded as shown. A filter area 510 provides information on available filters for the data display. An appropriate filter may be selected be clicking on the desired filter's name. A selection area 512 provides button interfaces to select additional data views.

Turning to the bottom of the GUI 500, an error/alerts section 514 shows active errors and alerts with details for each item displayed.

On the right hand side of the GUI 500, a display section 516 displays data associated with the selected menu item from the left hand side. A tab 518 provides an indication of what is displayed. For example, as shown, the data corresponding to the blocks menu item 504 and the selected display items from the headers 506 and 508.

A lower section 520 provides a display area for additional data. The tabs 522, 524, and 526 provide for selection of various data displays. When one of the tabs 522, 524, or 526 is selected, that display may be pulled to the forefront and shown in the display area 520. For example, as shown, the tab 522 may be selected showing a micro order status.

Figure 6:
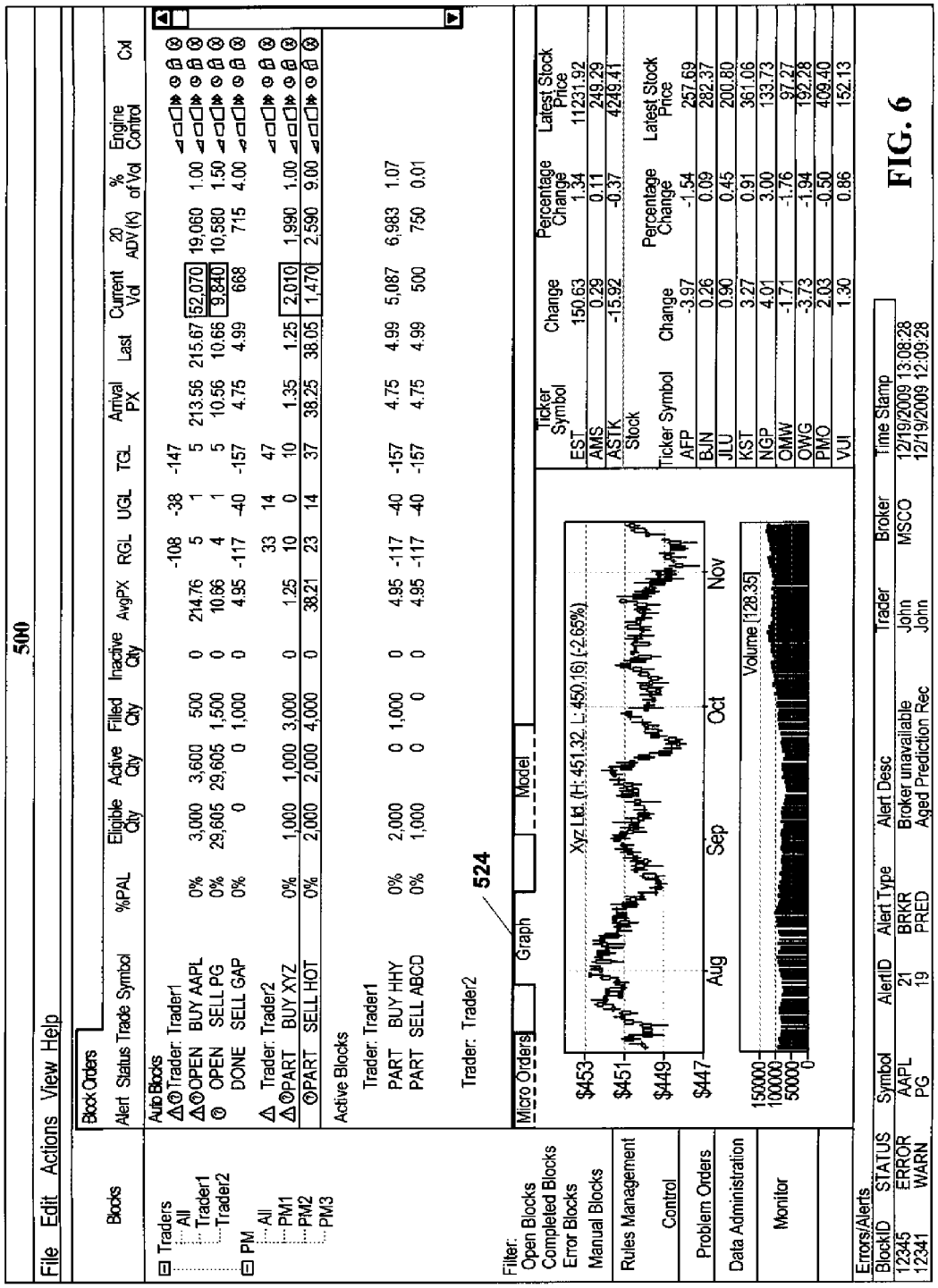
FIG. 6 shows a graphical user interface in accordance with exemplary embodiments.
Figure 7:
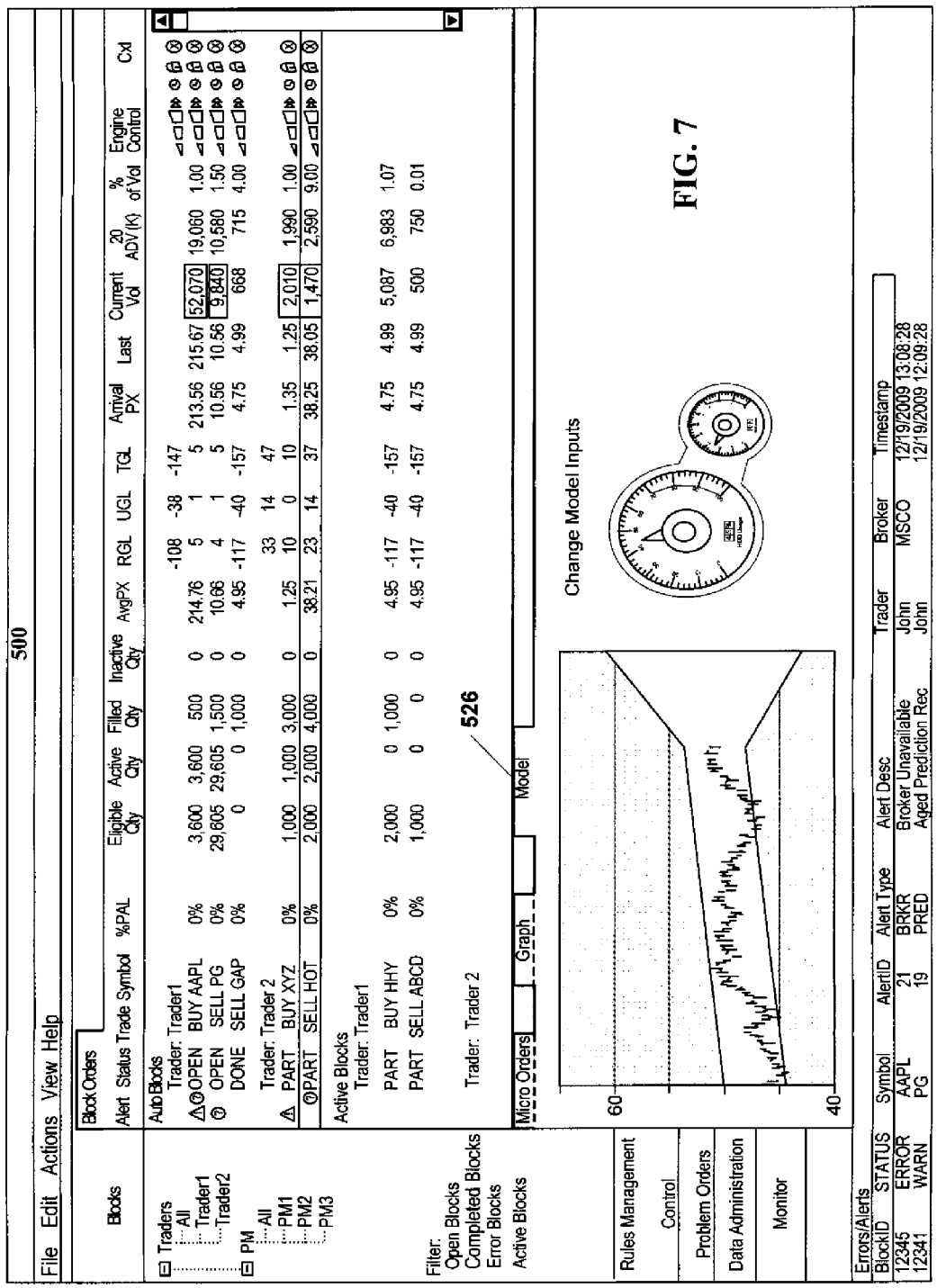
FIG. 7 shows a graphical user interface in accordance with exemplary embodiments.

Turning to FIG. 6, the GUI 500 is shown with the tab 524 selected. The data displayed in the lower section 520 has been altered as shown. FIG. 7 shows the GUI 500 with the tab 526 selected.

Figure 8:
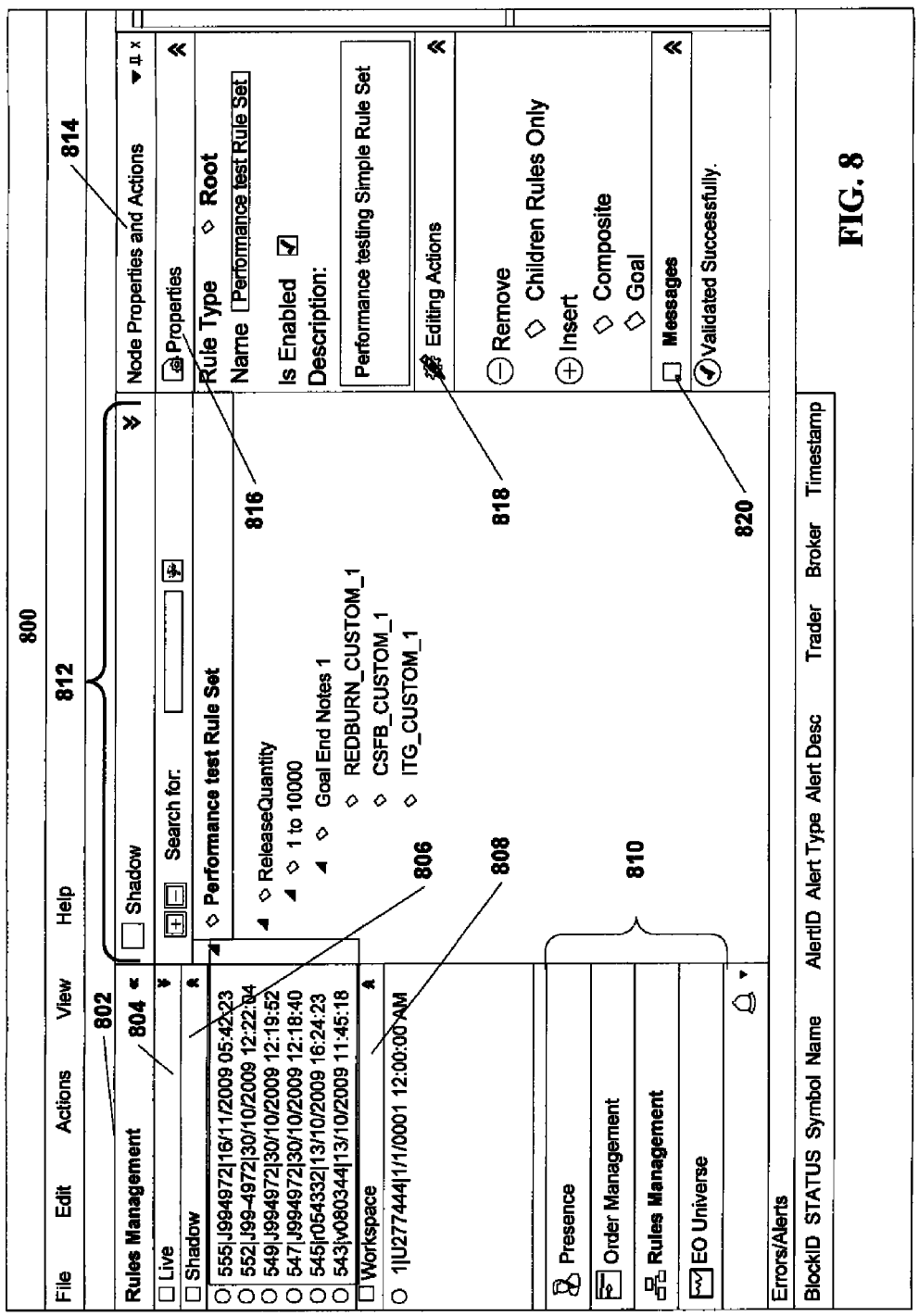
FIG. 8 shows a graphical user interface in accordance with exemplary embodiments.

FIG. 8 depicts a GUI 800 showing a rules management tool 802. The rules management tool 802 may serve as an interface to the rules engine. Through the rules management tool 802, rules may be created, edited, and deleted. Access to the rules management tool 802 may be restricted. Under the rules management tool 802, are a number of menu options for rule selection. The live rule menu 804 provides access to live rules. The shadow rule menu 806 provides access to shadow rules. The workspace menu 808 provides access to rules in progress. Below those menus, a menu set 810 provides access to additional functions. In the center of the GUI 800, a work area 812 provides a tree-like hierarchy view of a selected rule. On the right hand side of the GUI 800, a node properties and actions menu 814 provides information and action selection for the selected rule. For example, a properties section 816 provides data about the selected rule, a editing actions section 818 allows for various editing actions to be performed, and a messages section 802 provides information about the rule.

Figure 9:
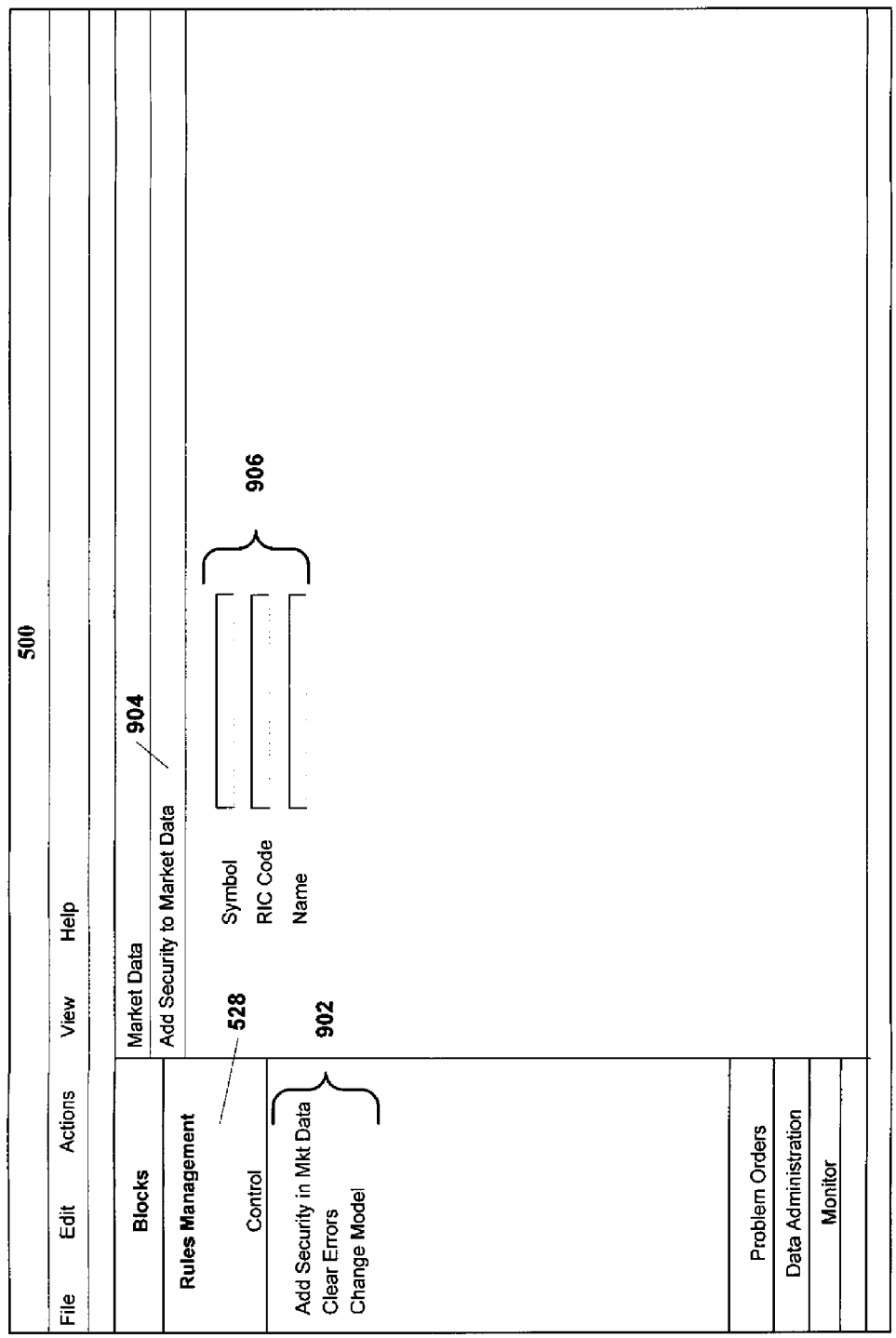
FIG. 9 shows a graphical user interface in accordance with exemplary embodiments.

FIG. 9 shows the GUI 500 with the rules management control menu 528 selected from the menu area 512. As shown, menu items 902 are available on the left hand side of the GUI 500. Selection of a menu item 902 may result in a different display in the area 904. For example, as shown, the add security in market data is selected and a corresponding entry screen in shown in the area 904.

Hereinafter, aspects of implementation of the exemplary embodiments will be described. As described above, the method of the invention may be computer implemented as a system. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. For example, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, ROM Ruby, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of media or medium, as desired. Further, the data for example processed by the set of instructions might also be contained on any of a wide variety of media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of execution of trades, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, uses and advantages of the present invention will be apparent to those skilled in the art from consideration of the specification and practice of the invention disclosed herein. The specification and examples should be considered exemplary.

What is claimed is:

1. A computer-implemented method for optimizing automatic execution of an order for securities, comprising:
receiving, by one or more computer processors, an order for specified securities;
applying, by the one or more computer processors, a profile to the order wherein the profile comprises data pertaining to trading habits of a portfolio manager;
routing, by the one or more computer processors, the order and the profile to a prediction model;
receiving, by the one or more computer processors, results from the prediction model;

applying, by the one or more computer processors, a set of rules to the order for determining an execution strategy for the order;

routing, by the one or more computer processors, the order for execution in accordance with the set of rules and the results from the prediction model;

receiving, by the one or more computer processors, feedback on the execution of the order;

updating, by the one or more computer processors, the set of rules based on the feedback; and forwarding, by the one or more computer processors, the feedback to a third party for updating the prediction model.

2. The method of claim 1, wherein the specified securities comprise stocks or bonds.

3. The method of claim 1, wherein the order is received at an investment bank.

4. The method of claim 1, wherein the profile is updated periodically.

5. The method of claim 1, wherein the profile comprises historical information pertaining to the trading habits of the portfolio manager.

6. The method of claim 1, wherein the profile comprises metrics associated with the trading habits of the portfolio manager, the metrics comprising price slippage.

7. The method of claim 1, wherein the set of rules comprises information relating to broker selection and order size.

8. The method of claim 1, wherein the prediction model is a price prediction model that analyzes the order and determines an execution strategy for the order based on pricing predictions.

9. The method of claim 1, wherein the updating of the set of rules and the prediction model occur in real time.

10. The method of claim 1, further comprising:
processing, iteratively, by the at least one computer processor, the order based on the feedback.

11. A computer based system for optimizing automatic execution of an order for securities, comprising:
a workstation, comprising one or more computer processors, communicatively coupled to a network, wherein the workstation provides an interface to the computer based system;
an execution optimizer module, comprising one or more computer processors, communicatively coupled to the network, wherein the execution optimizer module performs the following functions:
receiving an order for specified securities;
determining a profile associated with a portfolio manager to apply to the order;
applying the profile to the order;
routing the order and the profile to a prediction engine;
receiving results associated with the order from the prediction engine;
applying a set of rules, using a rules engine module, to the order for determining the execution strategy for the order;
forwarding the order for execution based on the prediction engine results and the set of rules;
receiving feedback on the execution of the order;
applying the feedback in real time to update the set of rules; and
forwarding the feedback to the prediction engine; and
a database, communicatively coupled to the execution optimizer module, the database comprising the set of rules and the profile.

12. The system of claim 11, wherein the prediction engine is managed by a third party.

13. The system of claim 11, wherein the specified securities comprise stocks or bonds.

14. The system of claim 11, wherein the order is received at an investment bank.

15. The system of claim 11, wherein the profile is updated periodically.

16. The system of claim 11, wherein the profile comprises historical information pertaining to trading habits of the portfolio manager.

17. The system of claim 11, wherein the profile comprises metrics associated with the trading habits of the portfolio manager, the metrics comprising price slippage.

18. The system of claim 11, wherein the set of rules comprises rules associated for execution of the order comprising information relating to broker selection and order size.

19. The system of claim 11, wherein the prediction engine applies a model that analyzes the order and determines an execution strategy for the order.

20. The system of claim 11, further comprising the execution optimizer module iteratively processing the order based on the feedback.

* * * * *